(12) United States Patent
Chernoff et al.

(10) Patent No.: US 7,028,791 B2
(45) Date of Patent: Apr. 18, 2006

(54) MOBILE CHASSIS AND INTERCHANGEABLE VEHICLE BODY WITH A HEATING, VENTILATION AND AIR CONDITIONING SYSTEM

(75) Inventors: Adrian B. Chernoff, Royal Oak, MI (US); Christopher E. Borroni-Bird, Oakland Township, MI (US); Mohsen D. Shabana, Ann Arbor, MI (US); Robert Louis Vitale, Macomb Township, MI (US)

(73) Assignee: General Motors Corporation, Detroit, MI (US)

( * ) Notice: Subject to any disclaimer, the term of this patent is extended or adjusted under 35 U.S.C. 154(b) by 266 days.

(21) Appl. No.: 10/206,404

(22) Filed: Jul. 26, 2002

(65) Prior Publication Data

US 2003/0038470 A1 Feb. 27, 2003

Related U.S. Application Data

(60) Provisional application No. 60/314,501, filed on Aug. 23, 2001, provisional application No. 60/337,994, filed on Dec. 7, 2001.

(51) Int. Cl.
*B60K 1/00* (2006.01)

(52) U.S. Cl. .............................. 180/65.1; 296/203.01; 454/69

(58) Field of Classification Search ............... 180/54.1, 180/58, 291, 65.2, 65.4, 68.1, 68.2, 65.3, 180/65.5, 65.1, 65.6; 296/70, 72, 208, 194, 296/230.01, 193.04, 193.05, 193.07, 203.01; 701/1, 22, 48; 454/69–73, 143–148
See application file for complete search history.

(56) References Cited

U.S. PATENT DOCUMENTS

| | | | |
|---|---|---|---|
| 2,303,286 A | 11/1942 | Lake | |
| 2,927,817 A | 3/1960 | Raup | 296/35 |
| 3,722,948 A | 3/1973 | Walsh et al. | |
| 4,165,794 A | 8/1979 | Warner et al. | |
| 4,189,864 A | 2/1980 | Saito | 46/202 |
| 4,216,839 A | 8/1980 | Gould et al. | |
| 4,363,999 A | 12/1982 | Preikschat | |
| 4,422,685 A | 12/1983 | Bonfilio et al. | 296/197 |
| 4,489,977 A | 12/1984 | Earing, Jr. | |
| 4,842,326 A | 6/1989 | DiVito | 296/196 |

(Continued)

FOREIGN PATENT DOCUMENTS

EP 274993 2/1991

(Continued)

OTHER PUBLICATIONS

Stuart Birch, "Stick or Non-Stick," Automotive Engineering International On Line, Mar. 2000.

(Continued)

*Primary Examiner*—Hau Phan
(74) *Attorney, Agent, or Firm*—Kathryn A. Marra

(57) ABSTRACT

A mobile chassis for vehicle body interchangeability has a heating, ventilation, and air conditioning (HVAC) system packaged in a rolling platform. The system is connected to a powertrain cooling loop for waste heat circulation and to an electric air conditioning compressor for cooling. Supplemental heating elements are utilized for additional heating loads. Airflow from the HVAC system flows into the vehicle body through single or multiple passthroughs from the rolling platform. The air is then distributed through a ducting system in the vehicle body. The ducting system utilizes floor structure, seat structure, body pillars, or other designed forms so that the airflow is positioned and directed as desired.

12 Claims, 29 Drawing Sheets

U.S. PATENT DOCUMENTS

| | | | |
|---|---|---|---|
| 5,058,016 A | 10/1991 | Davidovitch | |
| 5,193,635 A | 3/1993 | Mizuno et al. | 180/65.3 |
| 5,335,514 A * | 8/1994 | Hennessee et al. | 62/227 |
| 5,352,011 A | 10/1994 | Kihara et al. | |
| 5,366,281 A | 11/1994 | Littlejohn | 303/3 |
| 5,409,283 A | 4/1995 | Ban | |
| 5,418,437 A | 5/1995 | Couture et al. | |
| 5,509,275 A * | 4/1996 | Bhatti et al. | 62/271 |
| 5,534,848 A | 7/1996 | Steele et al. | 340/517 |
| 5,606,503 A | 2/1997 | Shal et al. | 364/423.098 |
| 5,609,353 A | 3/1997 | Watson | 280/707 |
| 5,641,031 A | 6/1997 | Riemer et al. | 180/65.3 |
| 5,725,350 A | 3/1998 | Christenson | 414/491 |
| 5,813,487 A | 9/1998 | Lee et al. | 180/65.1 |
| 5,823,636 A | 10/1998 | Parker et al. | 303/3 |
| 5,902,181 A * | 5/1999 | Bain | 454/144 |
| 6,059,058 A | 5/2000 | Dower | 180/65.3 |
| 6,073,987 A * | 6/2000 | Lindberg et al. | 180/90 |
| 6,097,286 A | 8/2000 | Discenzo | |
| 6,102,151 A | 8/2000 | Shimizu et al. | |
| 6,176,341 B1 | 1/2001 | Ansari | 180/402 |
| 6,195,999 B1 | 3/2001 | Arnold et al. | 60/649 |
| 6,196,308 B1 * | 3/2001 | Halligan | 454/120 |
| 6,208,923 B1 | 3/2001 | Hommel | 701/42 |
| 6,219,604 B1 | 4/2001 | Dilger et al. | 701/41 |
| 6,223,843 B1 | 5/2001 | O'Connell et al. | 180/65.3 |
| 6,305,758 B1 | 10/2001 | Hageman et al. | 303/115.2 |
| 6,314,949 B1 * | 11/2001 | DeGrazia et al. | 123/542 |
| 6,318,494 B1 | 11/2001 | Pattok | 180/402 |
| 6,321,145 B1 | 11/2001 | Rajashekara | 701/22 |
| 6,370,460 B1 | 4/2002 | Kaufmann et al. | 701/41 |
| 6,378,637 B1 | 4/2002 | Ono et al. | 180/65.3 |
| 6,390,217 B1 * | 5/2002 | O'Brien et al. | 180/68.6 |
| 6,390,565 B1 | 5/2002 | Riddiford et al. | 303/3 |
| 6,394,207 B1 | 5/2002 | Skala | 180/65.2 |
| 6,394,218 B1 | 5/2002 | Heitzer | 180/402 |
| 6,394,537 B1 | 5/2002 | DeRees | |
| 6,397,134 B1 | 5/2002 | Shal et al. | 701/37 |
| 6,408,966 B1 | 6/2002 | Benz et al. | |
| 6,415,851 B1 * | 7/2002 | Hall et al. | 454/144 |
| 6,424,900 B1 | 7/2002 | Murray et al. | |
| 6,435,584 B1 | 8/2002 | Bonnville | |
| 6,439,648 B1 * | 8/2002 | Crean | 280/789 |
| 6,441,510 B1 * | 8/2002 | Hein et al. | 701/36 |
| 6,447,041 B1 * | 9/2002 | Vandersluis et al. | 296/72 |
| 6,464,027 B1 * | 10/2002 | Dage et al. | 180/65.2 |
| 6,488,345 B1 | 12/2002 | Woody et al. | |
| 6,511,342 B1 * | 1/2003 | Hein et al. | 439/502 |
| 6,547,152 B1 * | 4/2003 | Pawlak, III | 454/156 |
| 6,648,089 B1 * | 11/2003 | Wooldridge et al. | 180/68.4 |
| 2001/0029408 A1 | 10/2001 | Murray et al. | |

FOREIGN PATENT DOCUMENTS

| | | |
|---|---|---|
| GB | 2060514 | 5/1981 |
| GB | 2 178 701 A | 2/1987 |
| GB | 2 207 096 A | 1/1989 |

OTHER PUBLICATIONS

Sanket Amberkar, et al., "A System-Safety Process for by-Wire Automotive Systems", SAE Technical Paper, 2000-01-1056, SAE World Congress, Detroit, MI, Mar. 2000.

EDMUNDS.COM EDITORS, "Why Drive-by-Wire?", The New York Times, Nov. 29, 2000.

\* cited by examiner

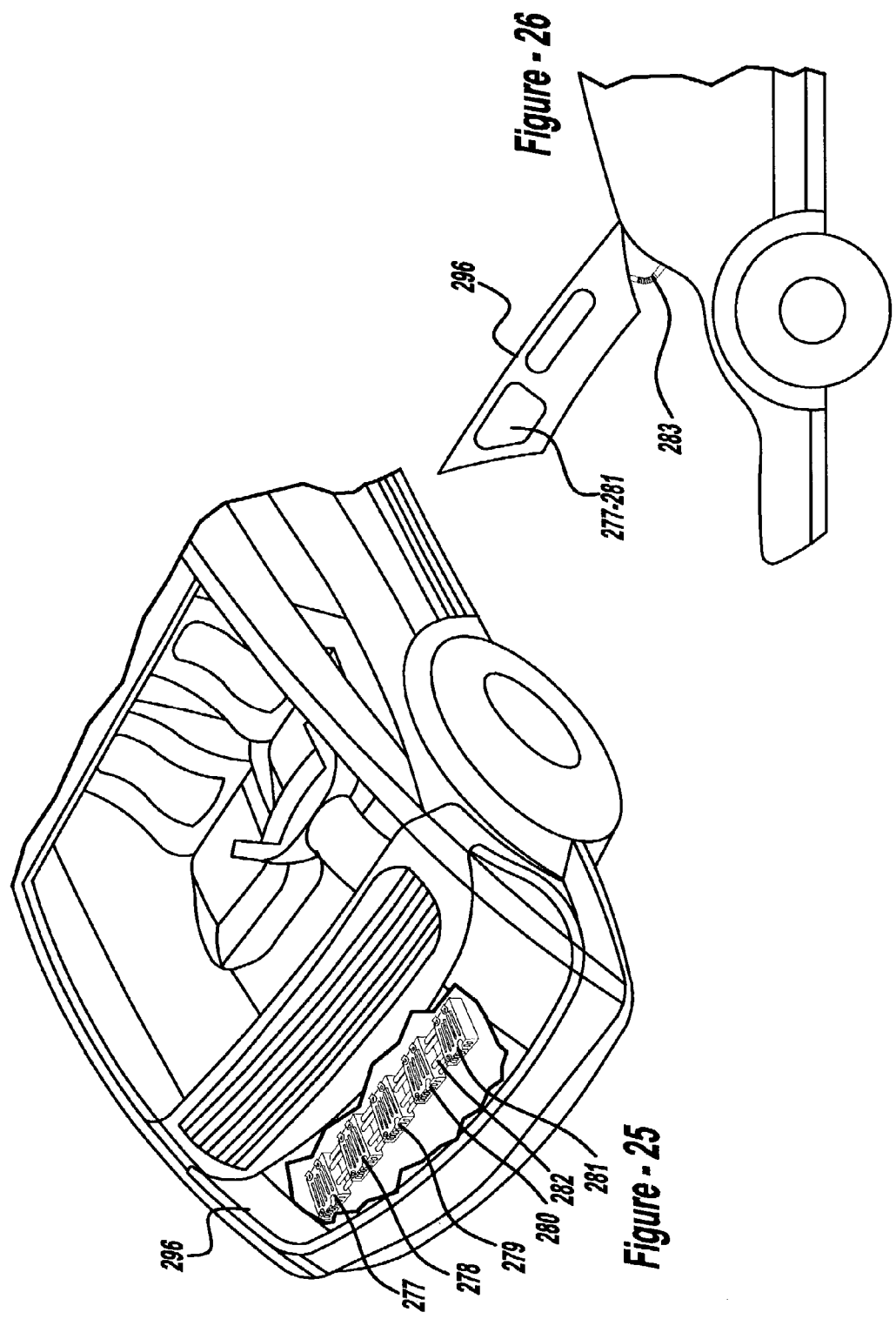

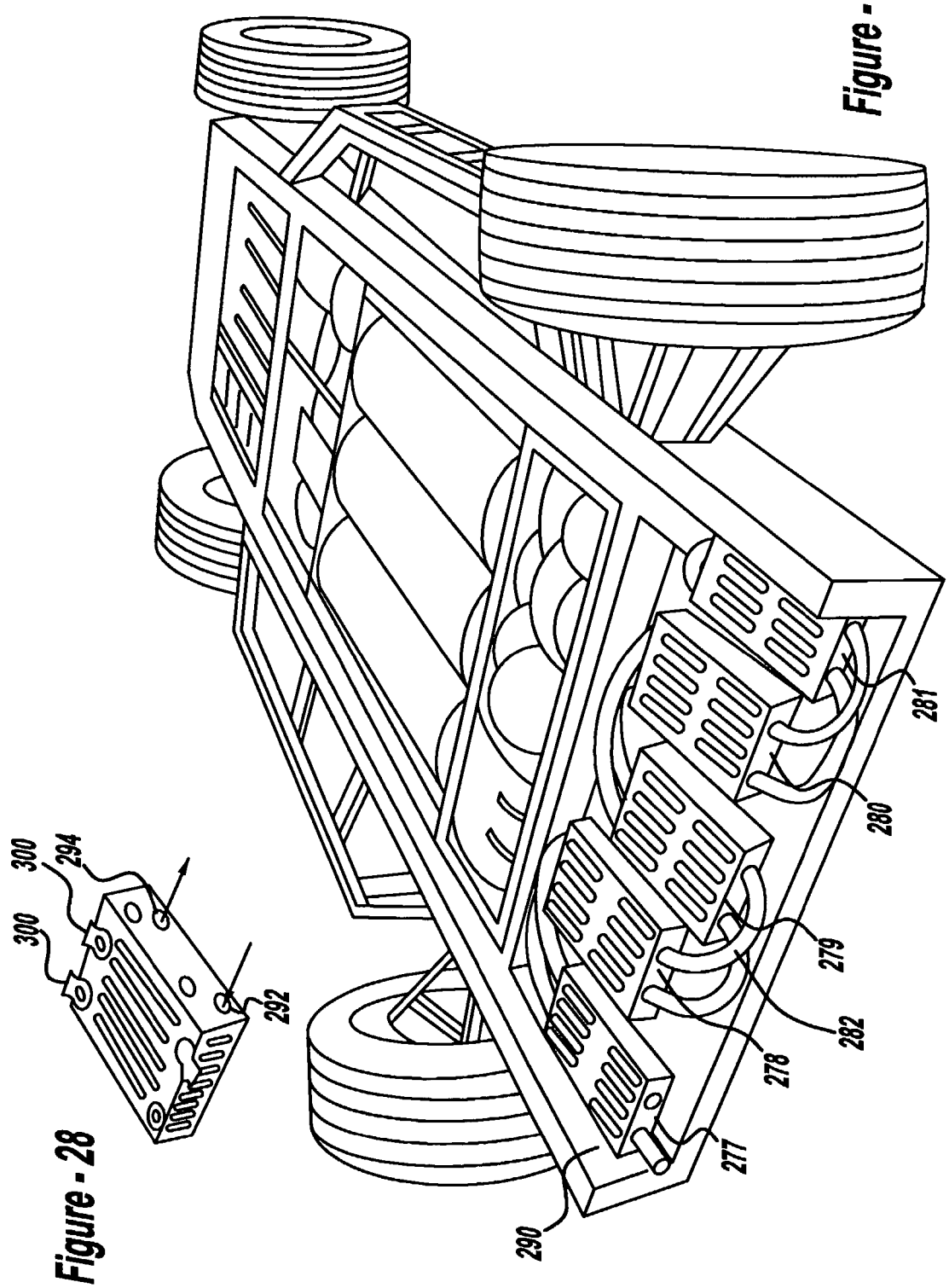

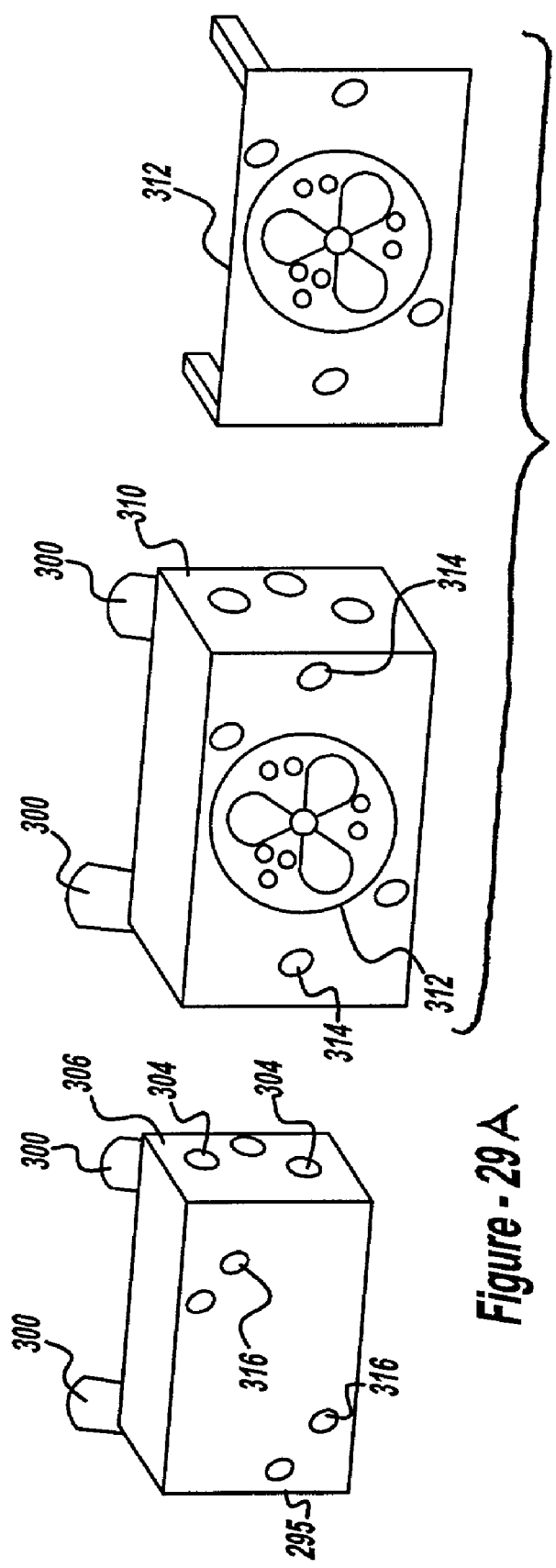
Figure - 29A
Figure - 29B
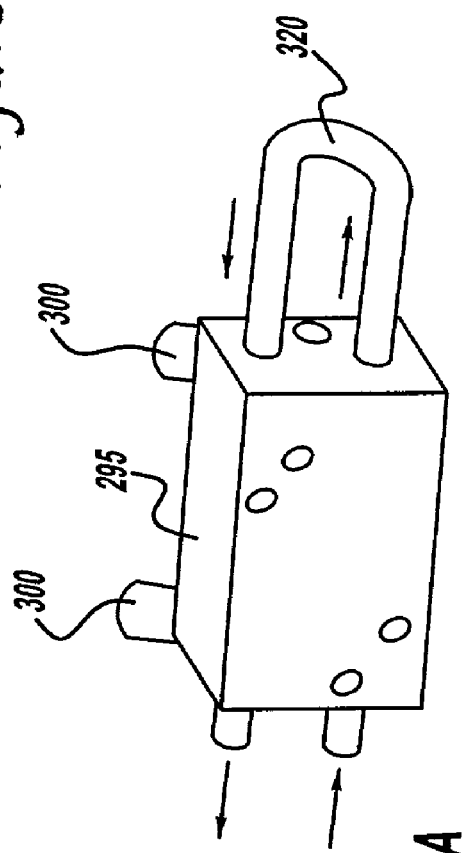
Figure - 30A

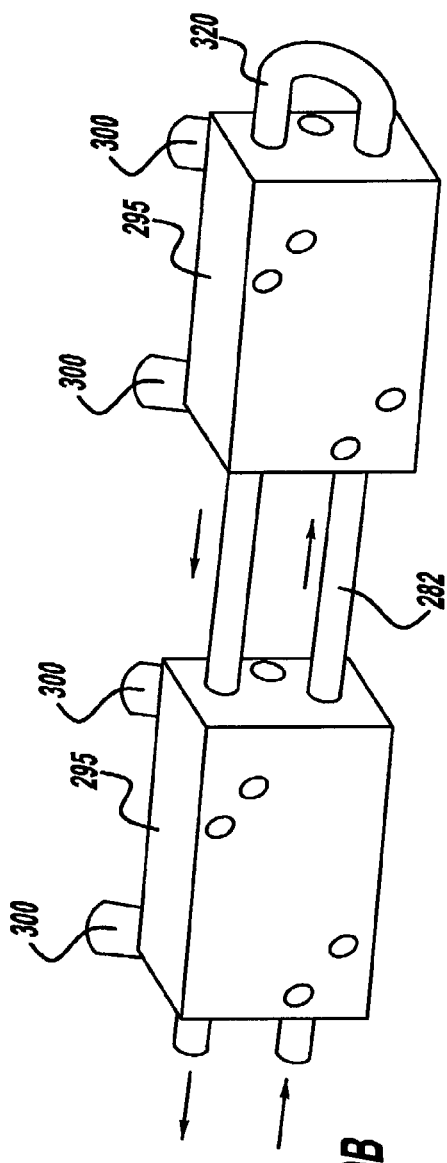
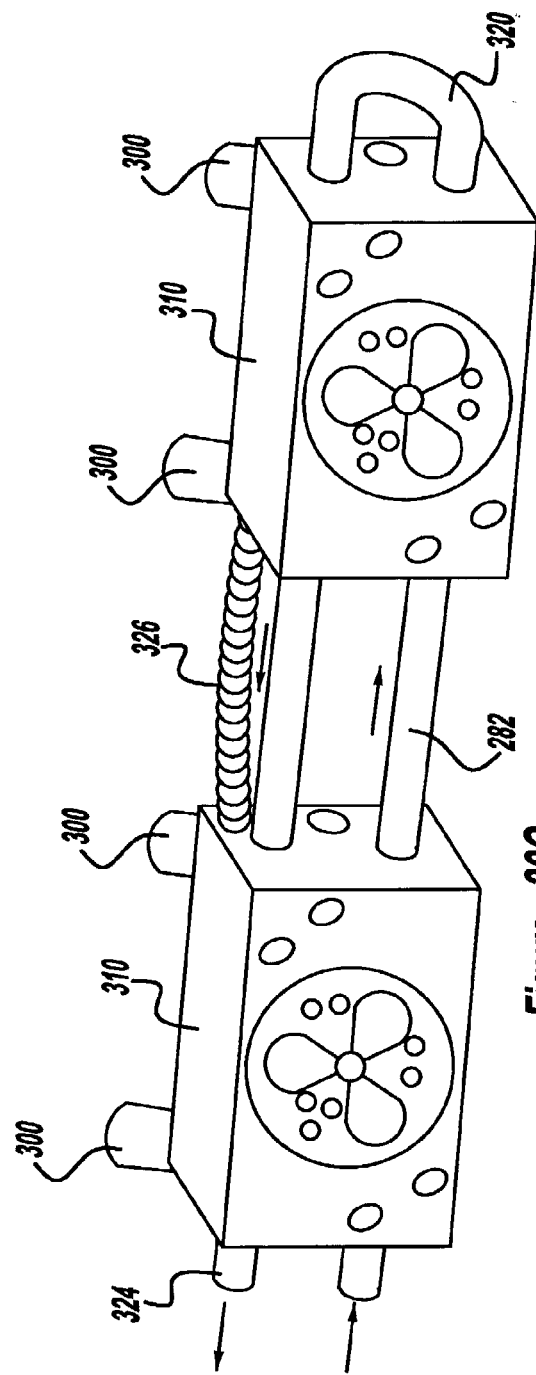
Figure - 30B
Figure - 30C

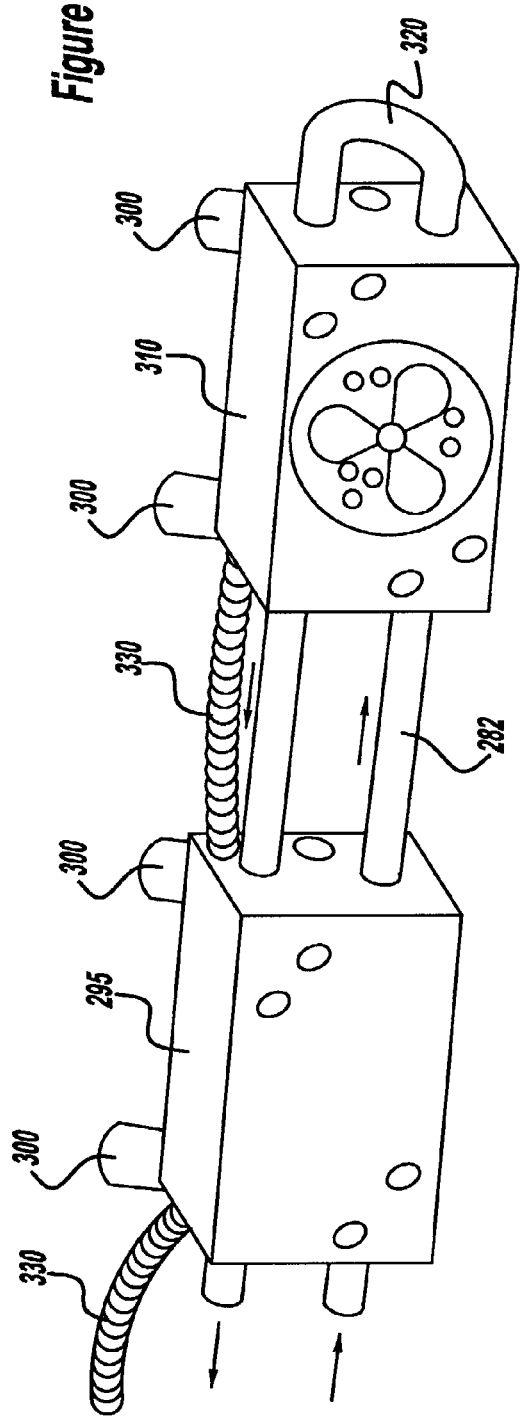
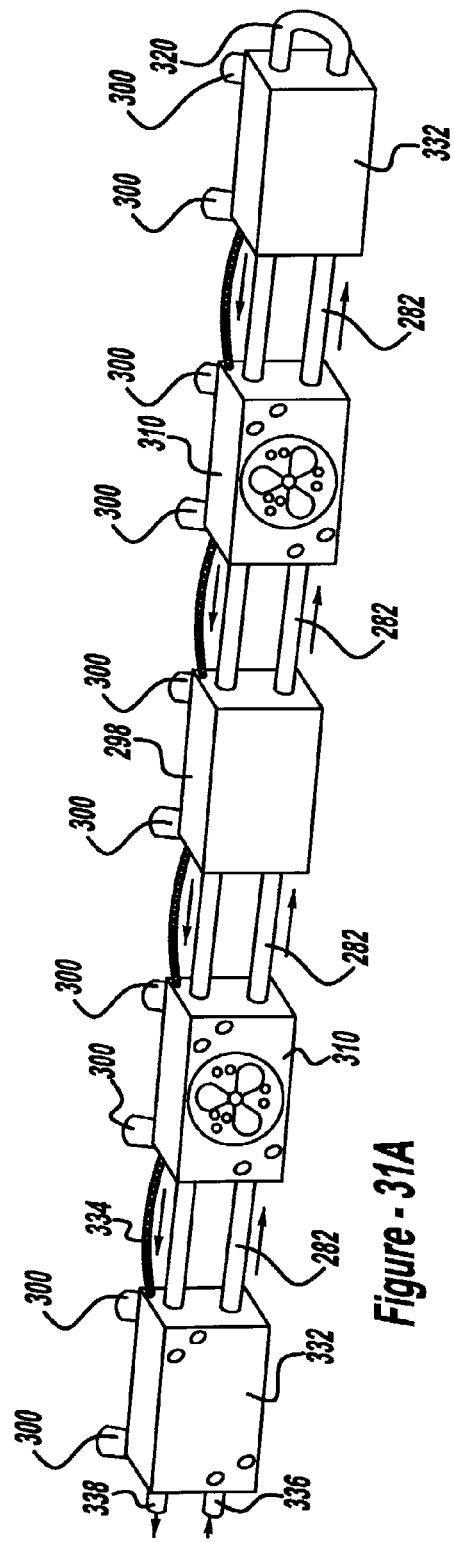

MOBILE CHASSIS AND INTERCHANGEABLE VEHICLE BODY WITH A HEATING, VENTILATION AND AIR CONDITIONING SYSTEM

CROSS-REFERENCE TO RELATED APPLICATIONS

This application claims the benefit of U.S. Provisional Applications Nos. 60/314,501 and 60/337,994, filed Aug. 23, 2001 and Dec. 7, 2001, both of which are hereby incorporated by reference in their entirety.

TECHNICAL FIELD

This invention relates to HVAC systems for vehicle chassis and bodies.

BACKGROUND OF THE INVENTION

Mobility, being capable of moving from place to place or of moving quickly from one state to another, has been one of the ultimate goals of humanity throughout recorded history. The automobile has likely done more in helping individuals achieve that goal than any other development. Since its inception, societies around the globe have experienced rates of change in their manner of living that are directly related to the percentage of motor vehicle owners among the population.

Prior art automobiles and light trucks include a body, the function of which is to contain and protect passengers and their belongings. Bodies are connected to the numerous mechanical, electrical, and structural components that, in combination with a body, comprise a fully functional vehicle. The nature of the prior art connections between a vehicle body and vehicular componentry may result in certain inefficiencies in the design, manufacture, and use of vehicles. Three characteristics of prior art body connections that significantly contribute to these inefficiencies are the quantity of connections; the mechanical nature of many of the connections; and the locations of the connections on the body and on the componentry.

In the prior art, the connections between a body and componentry are numerous. Each connection involves at least one assembly step when a vehicle is assembled; it is therefore desirable to reduce the number of connections to increase assembly efficiency. The connections between a prior art body and prior art vehicular componentry include multiple load-bearing connectors to physically fasten the body to the other components, such as bolts and brackets; electrical connectors to transmit electrical energy to the body from electricity-generating components and to transmit data from sensors that monitor the status of the componentry; mechanical control linkages, such as the steering column, throttle cable, and transmission selector; and ductwork and hoses to convey fluids such as heated and cooled air from a heating, ventilation and air conditioning system (HVAC) to the body for the comfort of passengers or from the vehicle so that waste heat produced by a fuel cell or propulsion system can be rejected or utilized as supplemental heat in the heating ventilation and air conditioning system (HVAC).

Many of the connections in the prior art, particularly those connections that transmit control signals, are mechanical linkages. For example, to control the direction of the vehicle, a driver sends control signals to the steering system via a steering column. Mechanical linkages result in inefficiencies, in part, because if a manufacturer changes the design of a body, a change in the design of the mechanical linkage and the component to which it is attached may be required. The change in design of the linkages and components requires modifications to the tooling that produces the linkages and components. Thus, new or different bodies often cannot use "off-the-shelf" components and linkages. Componentry for one vehicle body configuration is therefore typically not compatible for use with other vehicle body configurations.

The location of the connections on prior art vehicle bodies and componentry also results in inefficiencies. In prior art body-on-frame architecture, a connection on the body is often distant from its corresponding connection on the componentry; therefore, long connectors such as wiring harnesses and cables must be routed throughout the body from componentry. The vehicle body of a fully-assembled prior art vehicle is intertwined with the componentry and the connection devices, rendering separation of the body from its componentry difficult and labor-intensive, if not impossible. The use of long connectors increases the number of assembly steps required to attach a vehicle to its componentry.

Furthermore, prior art vehicles typically have internal combustion engines that have a height that is a significant proportion of the overall vehicle height. Prior art vehicle bodies are therefore designed with an engine compartment that occupies about a third of the front (or sometimes the rear) of the body length. Compatibility between an engine and a vehicle body therefore requires that the engine fit within the body's engine compartment without physical part interference. Moreover, compatibility between a prior art chassis with an internal combustion engine and a vehicle body requires that the body's engine compartment be located such that physical part interference is avoided. For example, a vehicle body with an engine compartment in the rear is not compatible with a chassis with an engine in the front.

SUMMARY OF THE INVENTION

A self-contained mobile chassis or rolling platform has substantially all of the mechanical, electrical, and structural componentry necessary for a fully functional vehicle, including at least an energy conversion or propulsion system having a powertrain and powertrain cooling loop. The chassis further includes a suspension and wheels, a steering system, a braking system, a heating, venting and air cooling system (HVAV), and means for controlling each of the systems. The chassis has a simplified, standardized interface with attachment couplings to which vehicle bodies of substantially varying design can be attached. By-wire technology is utilized to eliminate mechanical control linkages.

The heating, ventilation, and air conditioning (HVAC) system is packaged in the rolling platform or chassis and is connected to the powertrain cooling loop for waste heat circulation and to an air cooling system having an electric air cooling (A/C) compressor. Supplemental heating elements can be utilized for additional heating loads. Waste heat from the powertrain cooling loop can be utilized with a heat exchanger in the HVAC system. Airflow from the HVAC system flows into a selected vehicle body through single or multiple passthroughs from the rolling platform. The air is then distributed through a ducting system in the vehicle body. The ducting system for the different vehicle bodies to be interchanged can utilize the respective floor structure, seat structure, body pillars, and other designed forms where the airflow can be positioned and directed as desired for each vehicle body.

The invention reduces the amount of time and resources required to design and manufacture new vehicle bodies. Body designs need only conform to the simple attachment interface of the chassis, eliminating the need to redesign or reconfigure expensive components for each different body design.

The invention also allows a multitude of body designs to share a common chassis, enabling economies of scale for major mechanical, electrical, and structural components.

Couplings, exposed and unobstructed, increase manufacturing efficiency because attachment of a body to the chassis requires only engagement of the couplings to respective complementary couplings on a vehicle body.

Vehicle owners can increase the functionality of their vehicles at a lower cost than possible with the prior art because a vehicle owner need buy only one chassis upon which to mount a multitude of body styles or designs.

Accordingly, the invention is a mobile chassis for vehicle body interchangeability. The chassis includes a structural frame having a plurality of spaced-apart structural members interconnected in a manner to define a plurality of packaging spaces and an upper chassis face with connective elements adapted to unobstructably connect with connective elements on the lower body face of the vehicle body as the connective elements mate at an external interface. A propulsion system is at least partially in at least one of the packaging spaces and is controllable by wire and includes a disconnectable connector in the interface operable to disconnect the controllability of the mobile chassis by wire. The chassis also includes a heating, ventilation and air conditioning system (HVAC) in at least another of the packaging spaces and has a disconnectable HVAC fluid coupling in the external interface connectable to direct fluid flow from the HVAC system.

The chassis may also include a heat exchanger in at least one of the packaging spaces which utilizes waste heat rejected from the powertrain cooling loop. The heat exchanger is in fluid flow communication with the fluid flow from the HVAC system for supplemental passenger heating. Other heat exchangers may exhaust or radiate waste heat to the ambient atmosphere for cooling the propulsion system.

The invention is also a drivably mobile chassis for mating with a plurality of selectable differently configured vehicle bodies, each having at least one heating, ventilation and air conditioning (HVAC) duct connector or connective element in a fixed position common to each of the vehicle bodies. The chassis has a frame having a plurality of spaced-apart structural members interconnected in a manner to define a plurality of internal packaging spaces and connective elements adapted to mate with the connective elements of each of the vehicle bodies at an external interface. An HVAC system is at least partially in at least one of the packaging spaces and has an HVAC fluid coupling mounted in the interface in a fixed position with respect to the frame. The HVAC fluid coupling is operably connectable to the HVAC duct connector when a selected one of the vehicle bodies is mated with the chassis.

The mobile chassis of this invention may also include a waste heat emitting powertrain cooling loop and an air cooling system at least partially in selected other ones of the internal packaging spaces, so that the waste heat emitted by the cooling loop and the cooling affected by the air cooling system are in fluid flow communication with the HVAC fluid coupling.

The mobile chassis of this invention may also include a supplemental heating element arrangement in fluid flow communication with the HVAC fluid coupling.

The mobile chassis of this invention may also include a plurality of HVAC fluid couplings connectable respectively with a plurality of HVAC connectors on a selected one of the vehicle body configurations.

The mobile chassis of these inventions may be combined in a further combination with a selected vehicle body wherein the selected vehicle body includes fluid flow directing structure for positioning and directing the fluid flow as desired in the selected vehicle body.

More particularly, the vehicular chassis of this invention is also characterized by novel waste heat rejection. The chassis has a frame defining a plurality of open spaces, a suspension system including at least three wheels, a steering system having steering components, mounted with respect to the frame and operably connected to at least one wheel, and an energy conversion system having energy conversion system components, mounted with respect to the frame and operably connected to at least one wheel. A waste heat rejection system having waste heat rejection system components is operably connected to the energy conversion system. The waste heat rejection components include a coolant circulation system and a heat exchanger adjacent the energy conversion system. The coolant circulation system or cooling loop is operably connected to the heat exchanger. The chassis further includes an HVAC system having HVAC system components which are operably connected to the coolant circulation system. The chassis also includes a braking system having braking components, mounted with respect to the frame and operably connected to at least one wheel. A plurality of body-attachment couplings are mounted with respect to the frame and include a plurality of body-retention couplings, a control signal receiver coupling, and an HVAC fluid coupling; wherein the control signal receiver coupling is characterized as control-by-wire and is operably connected to the braking system, steering system, and propulsion system; and wherein the HVAC system is operably connected to the HVAC fluid coupling and the control signal receiver coupling; and wherein the steering components, energy conversion system components, waste heat rejection system components, braking components, HVAC system components, and body attachment couplings are mounted within the open spaces and do not protrude significantly outside the frame or the interface between the chassis and the selected one of a plurality of interchangeable vehicle body configurations.

The above structural objects and technical features, aspects, and advantages, and other objects, of the present invention are readily apparent from the following detailed description of the best mode for carrying out the invention when taken in connection with the accompanying drawings.

BRIEF DESCRIPTION OF THE DRAWINGS

FIGS. 20 and 20a show partial exploded perspective schematic illustration of a rolling platform according to a further embodiment of the invention in an attachment scenario with a body pod, the rolling platform having multiple electrical connectors engageable with complementary electrical connectors in the body pod;

FIG. 25 is a fragmentary perspective view of an interchangeable vehicle body with its hood broken away to show a plurality of waste heat rejection modules nestable or connectable in the hood of the vehicle body;

FIG. 26 is a fragmentary elevational view of the vehicle body in FIG. 25 with its hood open;

FIG. 27 is a left front perspective of the mobile chassis of FIGS. 24 and 25 showing a plurality of waste heat rejection modules connectable or nestable in the front of the mobile chassis;

FIG. 28 is a perspective view of a cooling module for use as a nestable or connectable heat exchanger for waste heat rejection;

FIGS. 29a and 29b are perspective views of air modules suitable for use with this invention and adaptable for ram air or forced air modification;

FIGS. 30a–d are perspective views of singular to multiple heat exchanger air modules usable in the vehicle bodies and/or rolling chassis of this invention, as a:

Figure 31B:
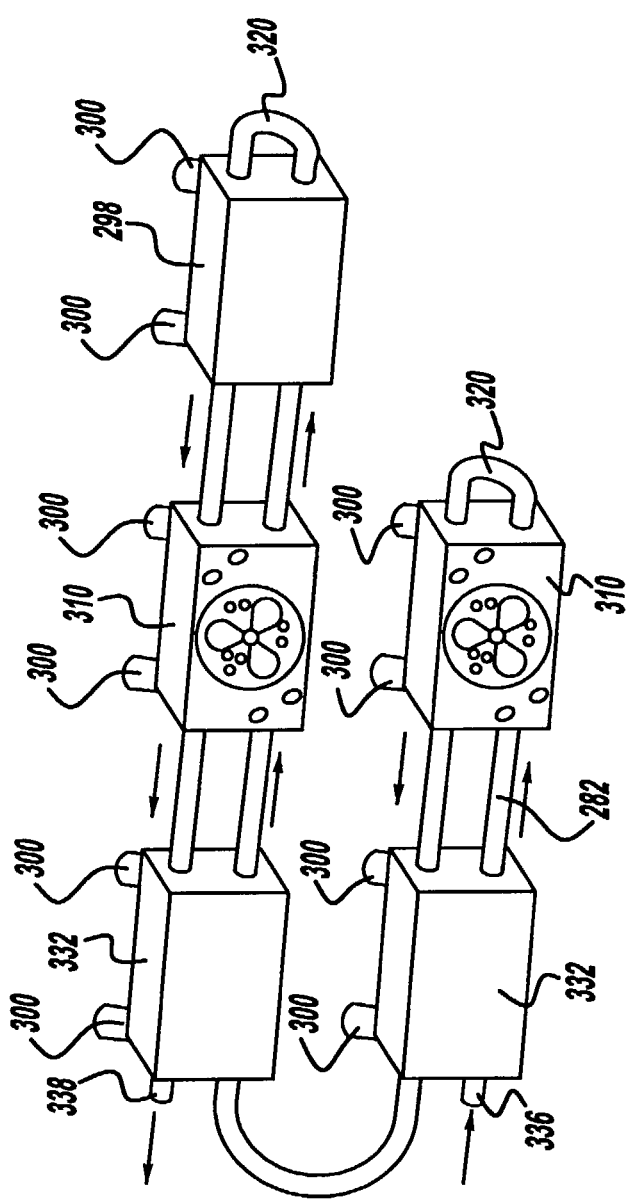
Figure 32:
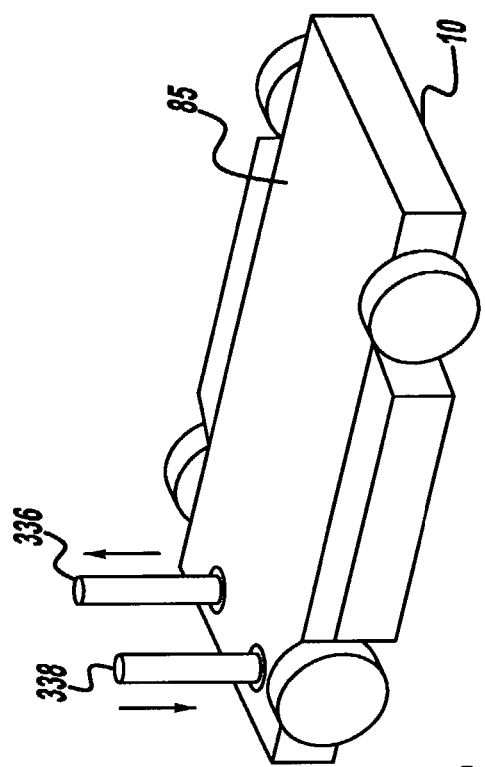
Figure 33:
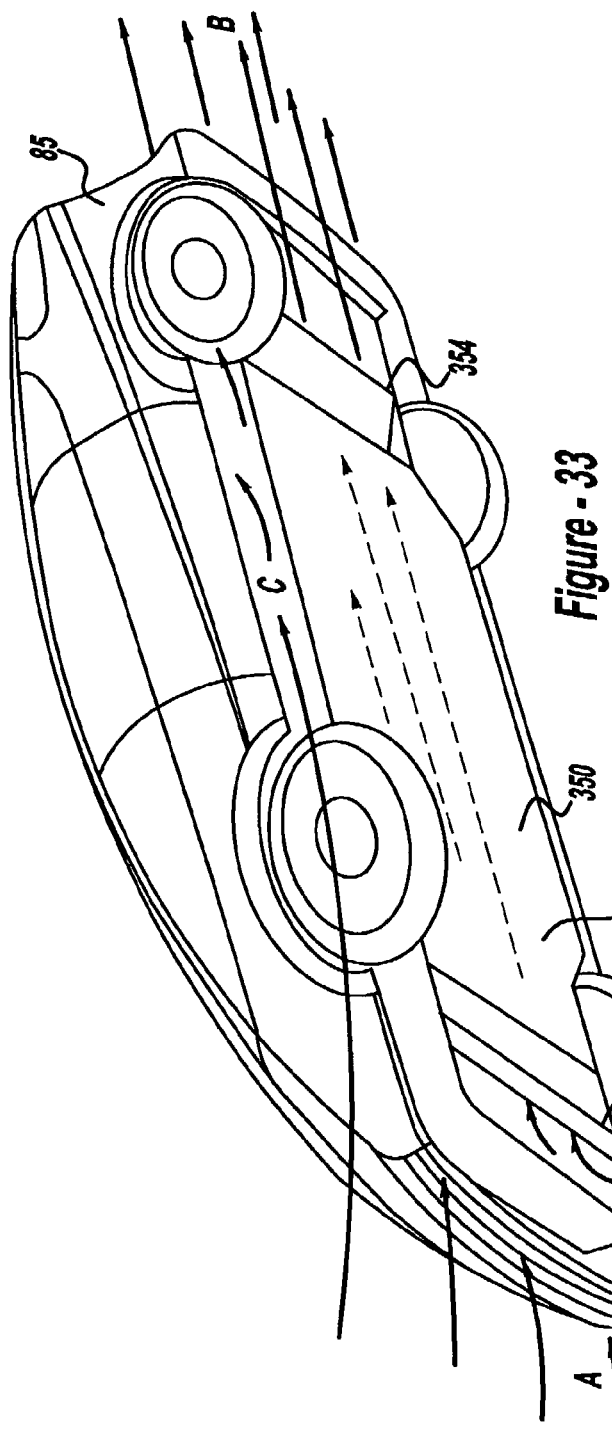
Figure 34:
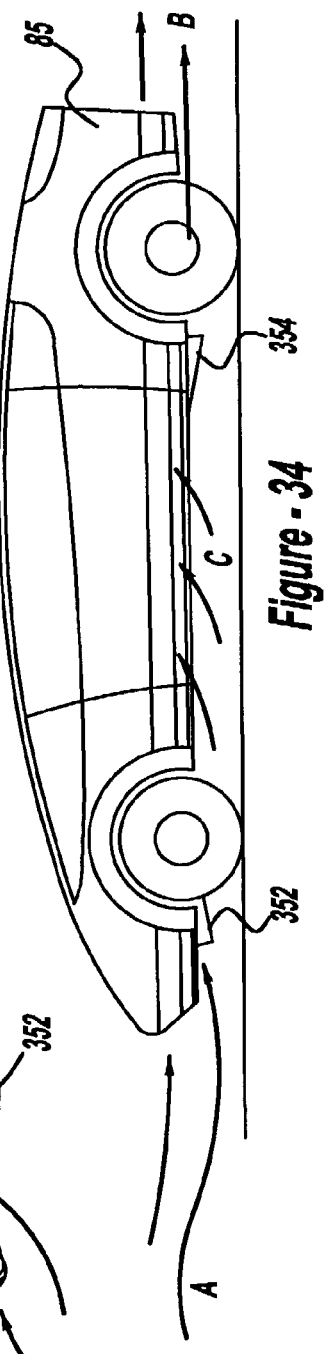

30a) source to single unit, 30b) source to ram air modules, 30c) source to forced air modules, and 30d) source to combination ram and forced air modules;

FIGS. 31a and 31b are perspective views of ram or forced air modules usable in vehicle bodies which are interchangeable with a rolling chassis having waste heat rejection to provide:

31a) in series thermoelectric energy to power forced air modules in combination with a ram air module, and 31b) in parallel thermoelectric modules to power forced air modules in combination with ram air modules;

FIG. 32 is a schematic perspective view of a rolling chassis provided with quick disconnect sources for waste heat rejection out of the chassis and received back into the chassis after flow through the cooling modules of FIGS. 27 and 28;

FIG. 33 is a left front perspective of the vehicle from the chassis bottom showing chassis air scoops for cooling chassis componentry; and FIG. 34 is a left side elevational view of the vehicle in FIG. 33.

DETAILED DESCRIPTION OF THE PREFERRED EMBODIMENT

Figure 1:
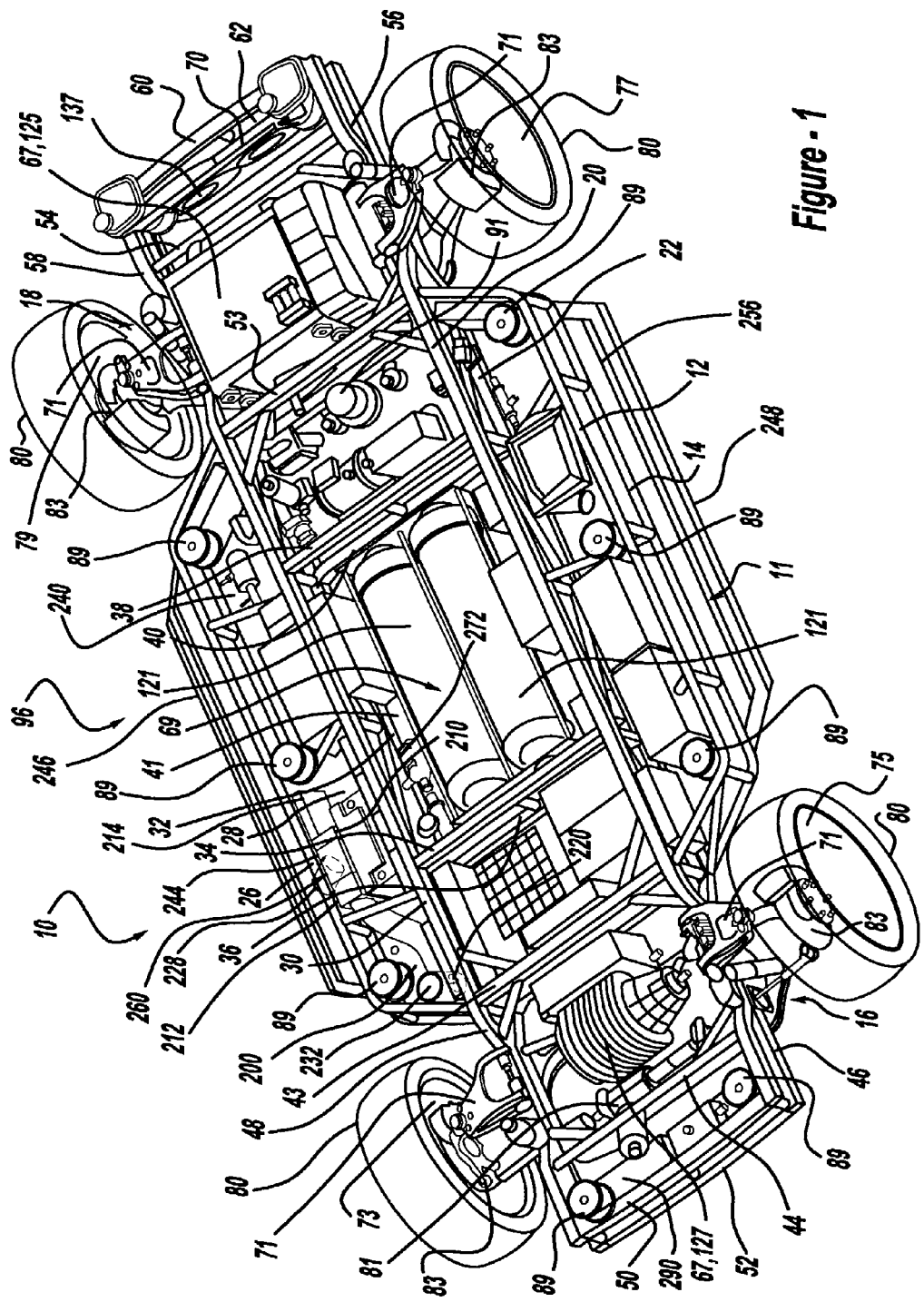
FIG. 1 is a schematic illustration in perspective view of a vehicle rolling platform with an HVAC system and waste heat rejection system packaged therein according to an embodiment of the present invention.

Referring to FIG. 1, the preferred embodiment of a vehicle chassis 10 in accordance with the invention, also referred to as the "rolling platform," includes a structural frame 11. The structural frame 11 comprises a series of interconnected structural elements including upper and lower side structural elements 12 and 14 that comprise a thin "sandwich"-like construction. Elements 12 and 14 are substantially rigid tubular (or optionally solid), members that extend longitudinally between the front and rear axle areas 16, 18, and are positioned outboard relative to similar elements 20, 22. The front and rear ends of elements 12, 14 are angled inboard, extending toward elements 20 and 22 and connecting therewith prior to entering the axle areas 16, 18. For added strength and rigidity a number of vertical and angled structural elements extend between elements 12, 14, 20 and 22. Similar to the elements 12, 14, 20 and 22, which extend along the left side of the rolling platform 10, a family of structural elements 26, 28, 30 and 32 extend along the right side thereof.

Lateral structural elements 34, 36 extend between elements 20, 30 and 22, 32, respectively nearer the front axle area 16 and lateral structural elements 38, 40 extend between elements 20, 30 and 22, 32, respectively nearer the rear axle area 18, thereby defining a mid-chassis space 41. The front axle area 16 is defined in and around structural elements 43, 44 at the rear and front, and on the sides by structural elements 46, 48 which may be extensions of the elements 20, 22, 30, 32 or connected therewith. Forward of the front axle area, a forward space is defined between element 44 and elements 50, 52. The rear axle area 18 is defined in and around structural elements 53, 54 at the front and rear, and on the sides by structural elements 56, 58, which may be extensions of the elements 20, 22, 30, 32 or connected therewith. Rearward of the rear axle area, a rearward space is defined between element 54 and elements 60, 62. The frame defines a plurality of open packaging spaces and an upper chassis face with connective elements adapted to connect with a lower body face with connective elements on interchangeable vehicle body pods as the connective elements mate at an external interface 87.

Figure 4:
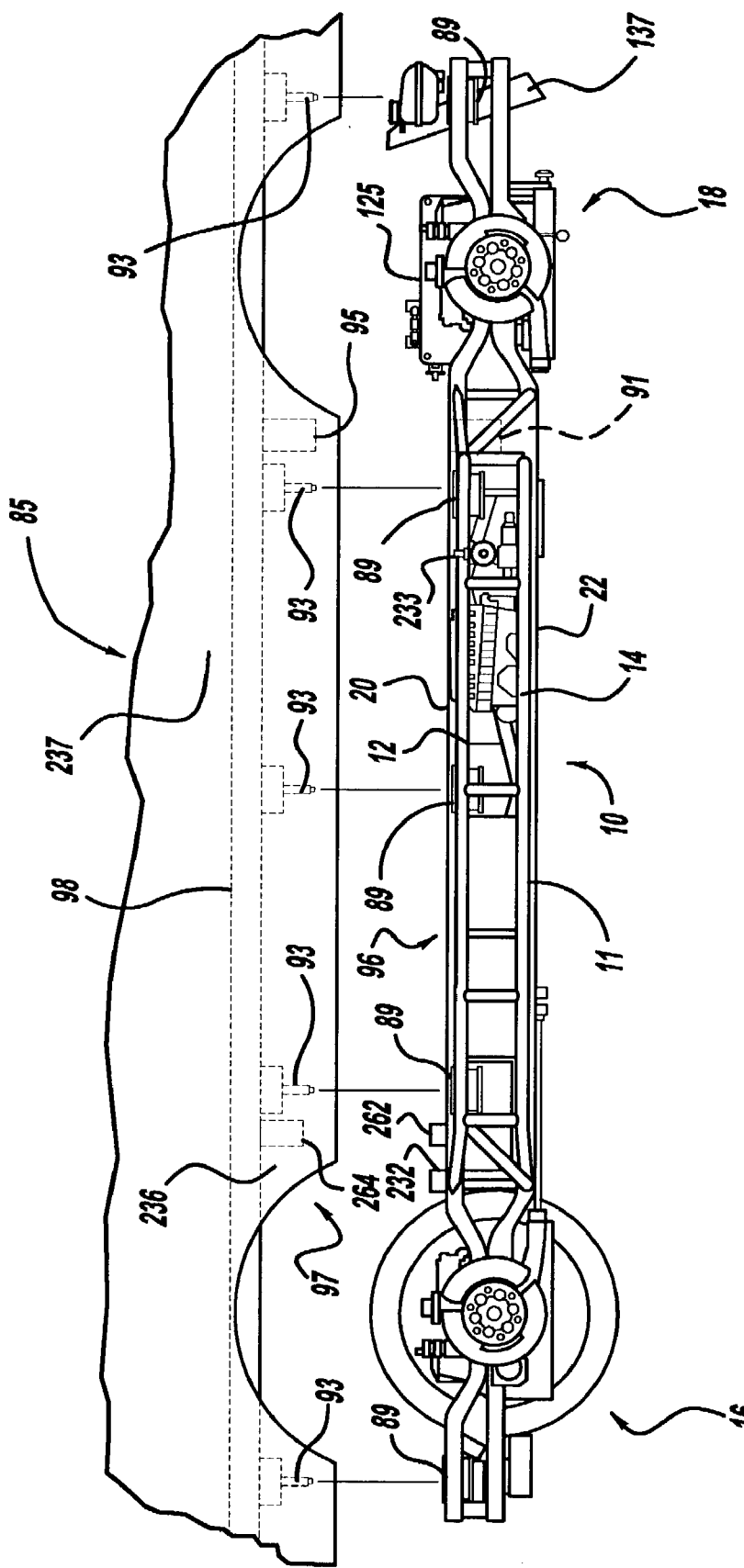
FIG. 4 is a schematic illustration in side view of a vehicle body pod and rolling platform attachment scenario according to the present invention that is useful with the embodiment of FIGS. 1–3.

The structural frame 11 provides a rigid structure to which an energy conversion system 67, energy storage system 69, suspension system 71 with wheels 73, 75, 77, 79, steering system 81, braking system 83 heating, ventilation and air conditioning or cooling system (HVAC) 200, and waste heat rejection system 202 are mounted. The frame is configured to support an attached body 85, as shown in FIG. 4. A person of ordinary skill in the art will recognize that the structural frame 11 can take many different forms, in addition to the cage-like structure of the preferred embodiment. For example, the structural frame 11 can be a traditional automotive frame having two or more longitudinal structural members spaced a distance apart from each other, with two or more transverse structural members spaced apart from each other and attached to both longitudinal structural members at their ends. Alternatively, the structural frame may also be in the form of a "belly pan," wherein integrated rails and cross members are formed in sheets of metal, with other formations to accommodate various system components.

The HVAC system 200 will be described with reference to FIGS. 1–5, 22 and 23. The HVAC system is packaged in structural frame 11 in packaging spaces 204, 208. The HVAC system includes a compressor 210, an evaporator 212, condenser 214 and an air flow device such as an air circulation fan 220. An air duct 224 connects the HVAC system in fluid flow communication with an ambient air inlet 228, the evaporator 212 and a connective element or coupling portion 232 adapted to connect with an interchangeable vehicle body 85. Vehicle body or body pod 85 includes a connective element or coupling portion 236 which leads to a vehicle body distribution duct 240 which may be configured in vehicle body structure so that conditioned air is sufficiently distributed throughout the vehicle to provide comfort for the passengers. Connective elements 232 and 236 are configured and positioned to mate easily and unobstructedly at the interface 87 when the chassis and body pod are brought together. Vehicle body 85 may also include fans in its structural members (roof, pillars, etc) which work in combination with chassis fan 220 to distribute conditioned air where needed in the interior passenger compartment 340.

Figure 24:
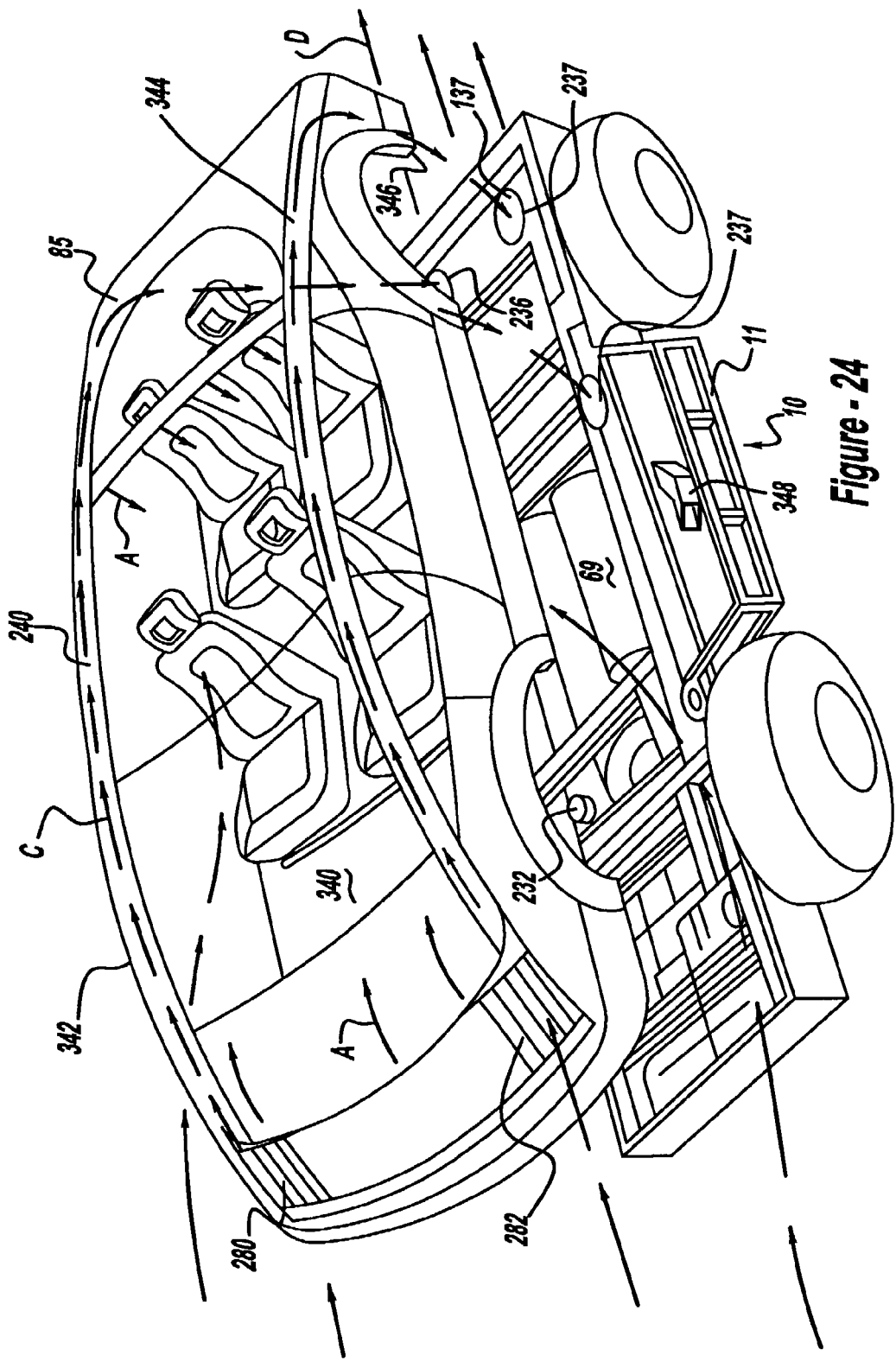
FIG. 24 is an exploded perspective view of a mobile chassis and an interchangeable body showing air scoops for exterior air entry, cockpit air flow, air flow within the body, and hot exhaust air flow for waste heat rejection.

With reference to FIG. 24, vehicle body 85 may include air scoops 280, 282. The scoops receive ram air into roof structure ducts 342, 344. The ram air received flows through the ducts to body outlet couplings at 346 on each side which are connectable with chassis inlets connected to heat exchanger 137. The ram air from air scoops 280, 282 may thus be used to cool chassis componentry. Some air may be redirected eventually back into the chassis through coupling 237 for additional componentry cooling. This ram air flow generally by passes the HVAC system 200 in the chassis and may leave the vehicle through chassis inlets 236, 237 which are connected through the rear bumper or facia to the atmosphere. An additional air scoop at 348 or on a belly pan can also be used to take in air for cooling the energy storage system 69 if needed.

FIG. 33 shows vehicle body 85 with an air scoop modification of the chassis 10 shown in FIG. 24. The modification includes a belly pan 350 having a forward inlet air scoop 352 and a rearward outlet air scoop 354. As shown, the exterior relatively cool ambient air flow A is ram air which enters the packaging spaces through air scoop 352 of the structural frame 11. It then wends its way through the packaging spaces and leaves or exhausts from the chassis through the rearward air scoop 354. The air flow through the chassis cools the functional componentry within the packaging spaces and exhausts the heated air B to the rear of the vehicle. Some exterior air flow C may wipe over the exterior of the chassis and assist in cooling the componentry. With the chassis air scoops of FIG. 33, the air scoop 348 for the energy storage system 69 in FIG. 24 may not be needed.

The waste heat rejection system 240 will be described with reference to FIG. 1. Waste heat is generated in the energy conversion system 67, the energy storage system 69, fuel cell stack 125, and engine 164, if any. The system includes heat exchangers 244 in the HVAC system, heat exchangers or cooling fins 246, 248 on the sides of the chassis, and radiator heat exchangers 137 which are in a fluid flow cooling loop 254. The cooling loop includes fluid flow conduits 256 (not shown for clarity) which are threaded through the available packaging spaces in the frame 11 to the cooling fins 246, 248 and the forced air cooled radiators or heat exchangers 137. Waste heat is utilized in the HVAC system in heat exchanger 244. The remainder of the heat generated by the chassis componentry is rejected to the atmosphere as exhaust air. Supplemental heating element 260 may also be included in the HVAC system, should the waste heat be insufficient to sufficiently warm the passenger compartment.

Thus the need to cool componentry creates waste heat which is shared between the HVAC system 200 and the waste heat rejection system 240.

Accordingly, and viewed in light of the foregoing, the interface 87, although preferably flat, is an imaginary surface that follows the upwardly facing contours of the chassis frame 11 or upper chassis face with all of its systems mounted therein and the downwardly facing contours of the vehicle body 85 or lower body face. It is at this imaginary surface that the vehicle chassis meets and coextensively, immediately mates with each and every one of the complementary and selectable vehicle bodies or body pods. The solution to this expeditious mating is having first connective elements (couplings) 232 on the chassis and second connective elements (connectors) 236 on the vehicle body which meet substantially and unobstructedly at the same place on the interface whenever a selected vehicle body or body pod from the selectable inventory of vehicle bodies is to be mated with the chassis. Thus the invention is to position the connective elements on the chassis so that they do not protrude significantly beyond the imaginary surface so that mating is accomplished quickly and easily.

Figure 2:
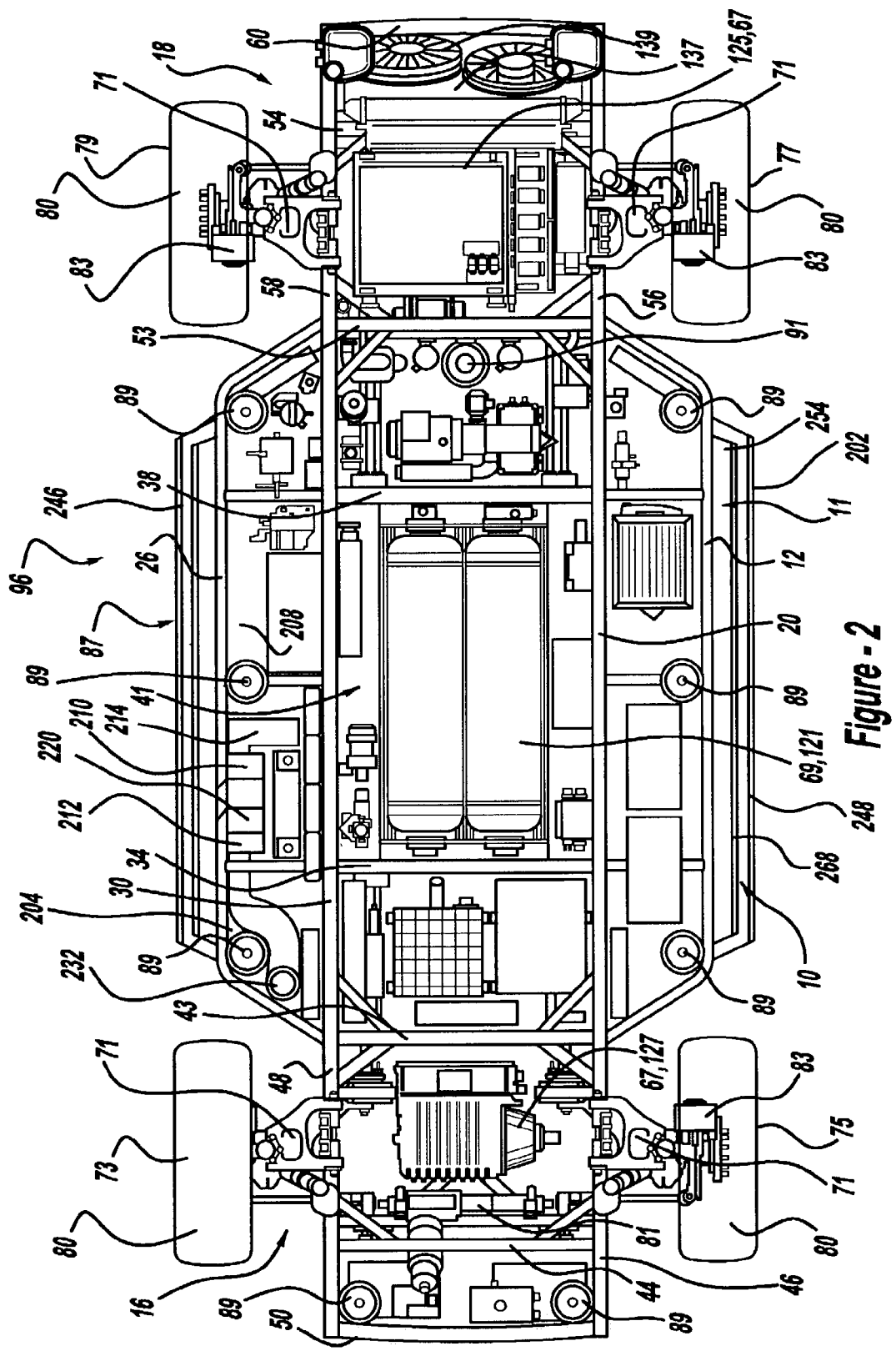
FIG. 2 a top view schematic illustration of the vehicle rolling platform shown in FIG. 1.

Referring to FIG. 2, a body attachment interface 87 contains all body attachment components, i.e., connective elements that function complementarily to operably mate a vehicle body to the chassis 10 quickly and efficiently by being mounted in a substantially fixed position with respect to the frame 11. The body attachment components of the preferred embodiment include a plurality of load-bearing body-retention couplings 89 and a single electrical connector 91. The interface may 87 also include respectively on the chassis and vehicle body disconnectable connective elements (fluid couplings) 262, 264 to effect fluid flow communication between the propulsion system and the heat exchangers to reject waste heat in both the mobile chassis (cooling fins 246, 248) and the vehicle body (air distribution duct 240, FIG. 22). The interface may also include one or more disconnectable heating, ventilation and air conditioning (HVAC) connective elements (fluid couplings) 232 connectable with other connective elements (connectors) 236 on the vehicle body to direct waste heat from the cooling loop 254 through the HVAC system in the chassis to the vehicle body.

As shown in FIG. 4, the load-bearing body-retention couplings 89 are engageable with complementary attachment couplings or connectors 93 on a vehicle body 85 and function to physically fasten the vehicle body 85 to the chassis 10. Those skilled in the art will recognize that a multitude of fastening and locking elements may be used and fall within the scope of the claimed invention. In the preferred embodiment, the load-bearing body-retention couplings 89 are support brackets with bolt holes. Rubber mounts (not shown) located on the support brackets dampen vibrations transmitted between the body and the chassis.

The electrical coupling 91 is engageable with a complementary electrical connector 95 on a vehicle body 85. The electrical coupling 91 of the preferred embodiment performs three functions. First, the electrical connector 91 is configured to transfer electrical energy generated by components on the chassis 10 to a vehicle body 85 or other non-chassis destination. Second, the electrical connector 91 functions as a control signal receiver, i.e., a device configured to transfer control signals from a non-chassis source to controlled systems including the energy conversion system, steering system, and braking system. Third, the electrical connector 91 functions as a port through which software and data may be transmitted to control units of controlled systems. The electrical connector 91 thus functions as a communications and power "umbilical" port through which all communications between the chassis 10 and an attached vehicle body 85 are transmitted. Alternatively, within the scope of the claimed invention, the body attachment interface 87 may include a plurality of electrical couplings 91 engageable with a plurality of complementary electrical connectors 95 on a vehicle body 85.

Referring again to FIGS. 1–4, the energy conversion system 67, energy storage system 69, steering system 81, and braking system 83, are configured and positioned on the chassis 10 to minimize the overall vertical height of the chassis 10 and to maintain a substantially horizontal upper chassis face 97. The structural frame 11 has a height defined as the vertical distance between its highest point (the top of the structural element 12) and its lowest point (the bottom of element 14). The energy conversion system 67, energy storage system 69, steering system 81, and braking system 83 are distributed throughout the open spaces and are configured, positioned, and mounted to the structural frame 11 such that no part of the energy conversion system 67, energy storage system 69, steering system 81, or braking system 83, extends or protrudes significantly beyond the heretofore described imaginary surface 87 or more than 50% of the structural frame's 11 height, or above the top of any of the wheels 73, 75, 77, 79—the object being to minimize the amount of protrusion of chassis components in the direction of the vehicle body beyond the imaginary surface. The substantially horizontal upper face enables the attached vehicle body to have a passenger area that extends the length of the chassis, unlike prior art bodies that have an engine compartment to accommodate a vertically-protruding internal combustion engine.

In the preferred embodiment, the body attachment components have a predetermined spatial relationship relative to one another, and are sufficiently positioned, exposed, and unobstructed such that when a vehicle body 85 having complementary attachment components (complementary attachment couplings 93 and a complementary electrical connector 95) in the same predetermined spatial relationship as the body attachment components is sufficiently positioned relative to a chassis 10 of the invention, the complementary components are adjacent to body-attachment components and ready for engagement, as depicted in FIG. 4. A protective covering (not shown) may be employed to protect any of the body attachment components. In the context of the present invention, a body attachment component having a protective covering is exposed and unobstructed if the protective covering is removable or retractable.

Figure 5:
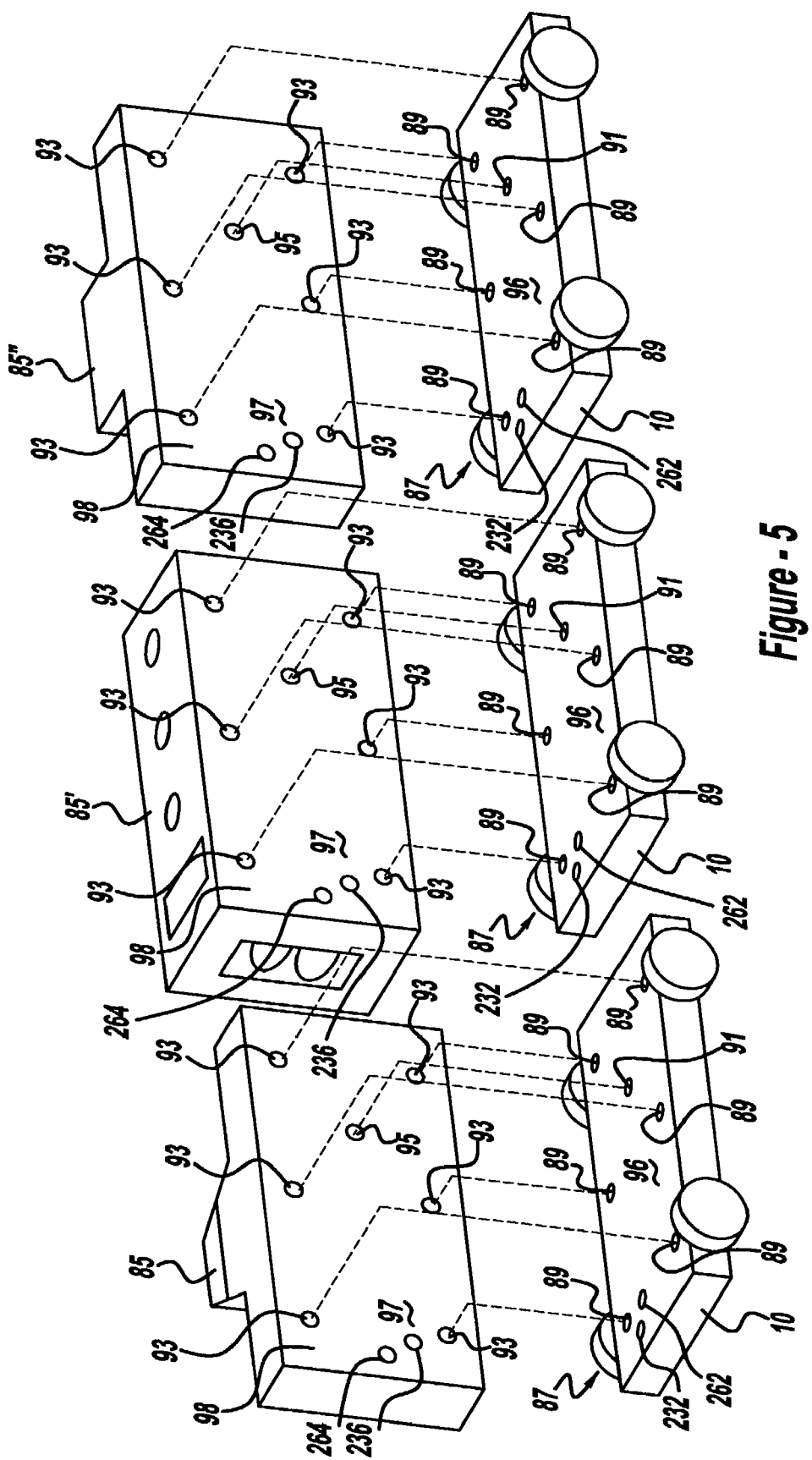
FIG. 5 is a schematic illustration of a vehicle body pod and rolling platform attachment scenario, wherein body pods of differing configurations are each attachable to identical rolling platforms.

Referring to FIG. 5, the body-attachment interface of the claimed invention enables compatibility between the chassis 10 and different types of bodies 85, 85', 85" having substantially different designs. Bodies 85, 85', 85" having a common base 98, or lower surface, with complementary attachment couplings 93 and complementary electrical connectors 95 in the same predetermined spatial relationship with one another as the predetermined spatial relationship between the load-bearing body-retention couplings 89 and the electrical connector 91 on the body-attachment interface 87, are each matable with the chassis 10 by positioning the body 85 relative to the chassis 10 such that each complementary attachment coupling 93 is adjacent to a load-bearing body-retention coupling 89, and the complementary electrical connector 95 is adjacent to the electrical connector 91. In accordance with the present invention, all bodies and chassis comply with this common, standardized interface system, thereby enabling a wide array of different body types and styles to be attached to a single chassis design. FIG. 5 schematically depicts a sedan 85, a van 85', and a pickup truck 85" each having a common base 98.

The load-bearing body-retention couplings 89 and the electrical connector 91 are preferably releasably engageable without damage to either an attached body 85 or the chassis 10, thereby enabling removal of one body 85 from the chassis 10 and installation of a different second body 85', 85" on the chassis 10.

In the preferred embodiment, the body-attachment interface 87 is characterized by the absence of any mechanical control signal-transmission linkages and any couplings for attaching mechanical control signal-transmission linkages. Mechanical control linkages, such as steering columns, limit the compatibility between a chassis and bodies of different configurations. The substantially horizontal upper chassis face 97 enables vehicle bodies 85 to extend substantially the length of the chassis 10.

Referring to FIG. 1, the steering system 81 is housed in the front axle area 16 and is operably connected to the front wheels 73, 75. In the preferred embodiment, the steering system 81 is by-wire. A by-wire system is characterized by control signal transmission in electrical form. In the context of the present invention, "by-wire" systems, or systems that are controllable "by-wire," include systems configured to receive control signals in electronic form via a control signal receiver on the body attachment interface 87, and respond in conformity to the electronic control signals.

Figure 6:
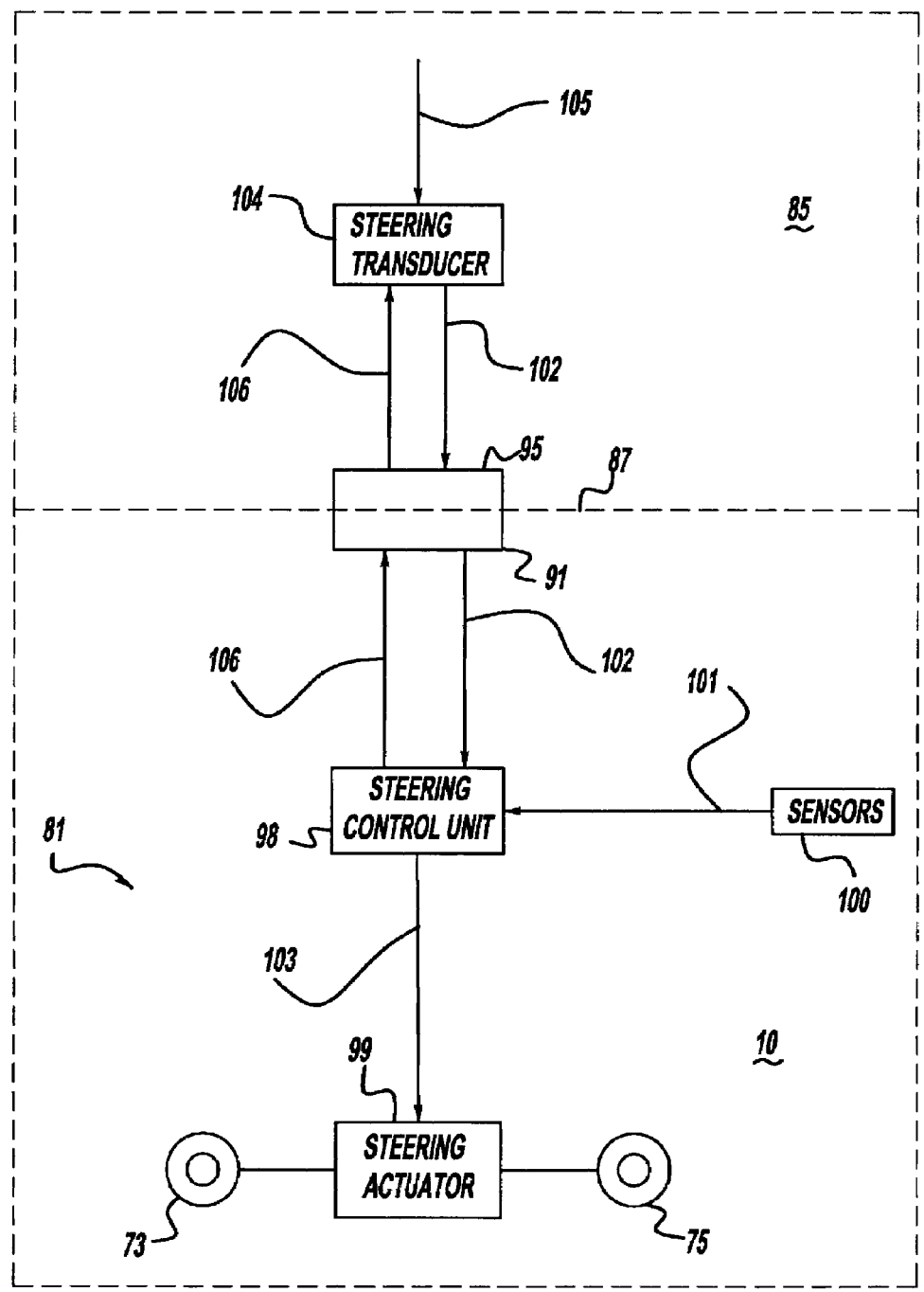
FIG. 6 is a schematic illustration of a steering system for use with the rolling platform and body pod shown in FIG. 4.

Referring to FIG. 6, the by-wire steering system 81 of the preferred embodiment includes a programmable steering control unit 98, and a steering actuator 99. Sensors 100 are located on the chassis 10 and transmit sensor signals 101 carrying information concerning the state or condition of the chassis 10 and its component systems. The sensors 100 may include position sensors, velocity sensors, acceleration sensors, pressure sensors, force and torque sensors, flow meters, temperature sensors, etc. The steering control unit 98 receives and processes sensor signals 101 and electrical steering control signals 102 from the electrical connector 91, and generates steering actuator control signals 103 according to a stored algorithm. Sensor signals may include yaw rate, lateral acceleration, angular wheel velocity, tie-rod force, steering angle, chassis velocity, etc. The steering actuator 99 is operably connected to the front wheels 73, 75 and configured to adjust the steering angle of the front wheels 73, 75 in response to the steering actuator control signals 103. Actuators in a by-wire system transform electronic control signals into a mechanical action or otherwise influence a system's behavior in response to the electronic control signals. Examples of actuators that may be used in a by-wire system include electromechanical actuators such as electric servomotors, translational and rotational solenoids, magnetorheological actuators, electrohydraulic actuators, and electrorheological actuators. Those skilled in the art will recognize and understand mechanisms by which the steering angle is adjusted. For example, the steering actuator 99 could be an electric servomotor configured to adjust a rack and pinion steering system.

In the context of the present invention, a control unit is programmable if the control unit is configured such that the algorithm, or parameters employed by the algorithm such as look-up tables, can be modified or changed to alter the operating characteristics of the by-wire system. Software for control units containing the algorithm and any parameters may be embodied in the form of computer program code containing instructions embodied in tangible media, such as floppy diskettes, CD-ROMs, hard drives, or any other computer-readable storage medium. A control unit typically includes a microprocessor, ROM and RAM and appropriate input and output circuits of a known type for receiving the various input signals and for outputting the various control commands to the actuators.

Referring again to FIG. 6, the preferred embodiment of the chassis 10 is configured such that it is steerable by any source of compatible electrical steering control signals connected to the electrical connector 91. FIG. 6 depicts a steering transducer 104 located on an attached vehicle body 85 and connected to a complementary electrical connector 95. Transducers convert the mechanical control signals of a vehicle driver to electrical control signals usable by a by-wire system. A vehicle driver inputs control signals in mechanical form by turning a wheel, depressing a pedal, pressing a button, or the like. Transducers utilize sensors, typically position and force sensors, to convert the mechanical input to an electrical signal. The complementary electrical connector 95 is coupled with the electrical connector 91 of the body attachment interface 87. The steering transducer 104 converts vehicle driver-initiated mechanical steering control signals 105 to electrical steering control signals 102 which are transmitted via the electrical connector 91 to the steering control unit 98. Optionally, the steering control unit 98 may also generate steering feedback signals 106 for use by a vehicle driver and transmit the steering feedback signals through the electrical connector 91. An example of how to provide steering feedback to a vehicle driver in a steer-by-wire system is found in U.S. Pat. No. 6,176,341, which is hereby incorporated by reference in its entirety.

In the context of the present invention, a "by-wire" system may be an actuator connected directly to an electrical connector in the body attachment interface.

Figure 7:
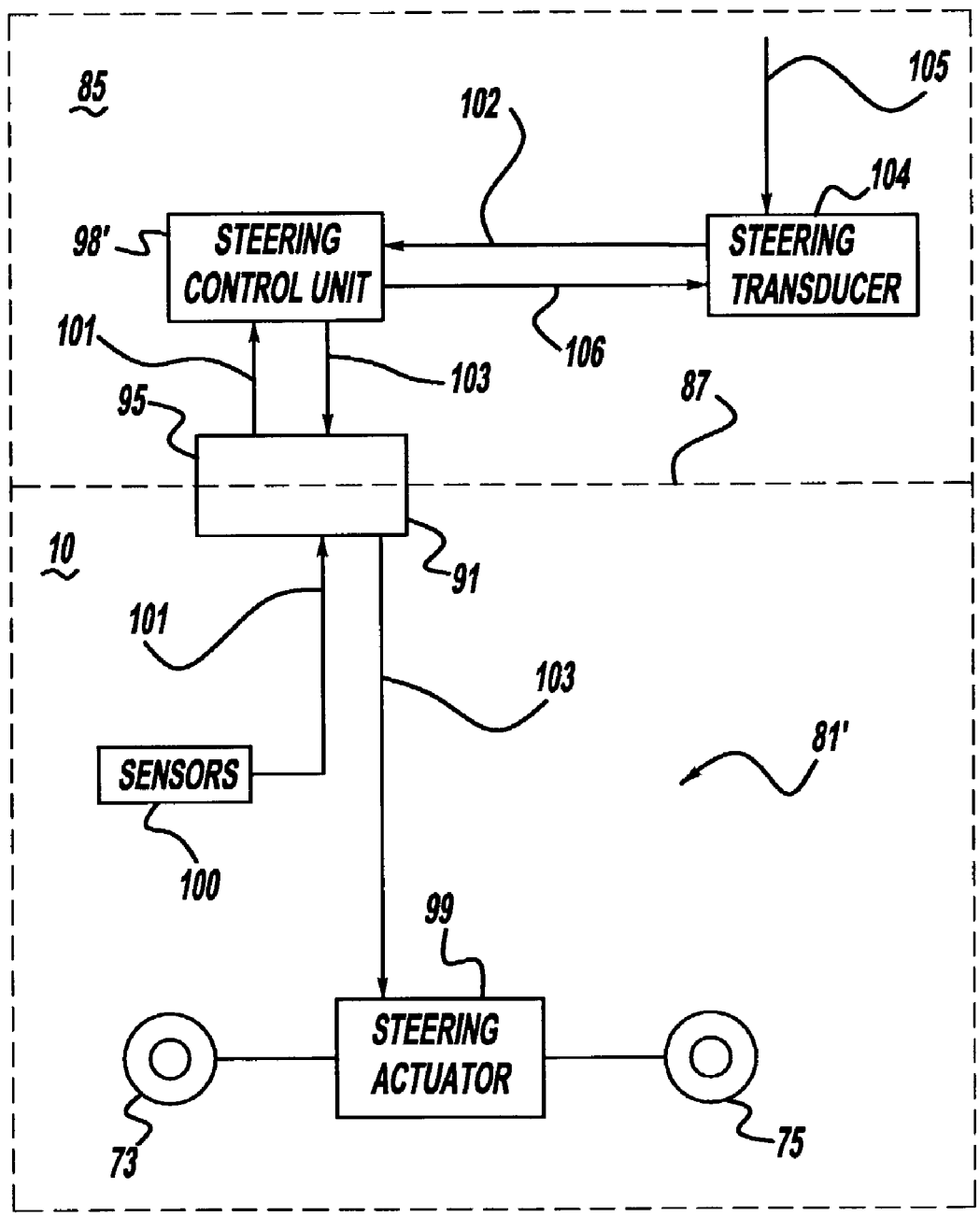
FIG. 7 is a schematic illustration of an alternative steering system for use in the rolling platform and body pod of FIG. 4.

An alternative by-wire steering system 81 within the scope of the claimed invention is depicted schematically in FIG. 7, wherein like reference numbers refer to like components from FIG. 6. A steering actuator 99 configured to adjust the steering angle of the front wheels 73, 75 is connected directly to the electrical connector 91. In this embodiment, a steering control unit 98' and a steering transducer 104 may be located in an attached vehicle body 85. The steering transducer 104 would transmit electrical steering control signals 102 to the steering control unit 98', and the steering control unit 98' would transmit steering actuator control signals 103 to the steering actuator 99 via the electrical connector 91. Sensors 100 positioned on the chassis 10 transmit sensor signals 101 to the steering control unit 98' via the electrical connector 91 and the complementary electrical connector 95.

Examples of other steer-by-wire systems are described in U.S. Pat. No. 6,176,341 Delphi, U.S. Pat. No. 6,219,604 Bosch, U.S. Pat. No. 6,394,218 TRW, U.S. Pat. No. 6,208,923 Bosch, U.S. Pat. No. 6,318,494 Delphi, and U.S. Pat. No. 6,370,460 Delphi which are hereby incorporated by reference in their entirety.

The steer-by-wire system described in U.S. Pat. No. 6,176,341 includes a position sensor for sensing angular position of a road wheel, a hand-operated steering wheel for controlling direction of the road wheel, a steering wheel sensor for sensing position of the steering wheel, a steering wheel actuator for actuating the hand-operated steering wheel, and a steering control unit for receiving the sensed steering wheel position and the sensed road wheel position and calculating actuator control signals, preferably including a road wheel actuator control signal and a steering wheel actuator control signal, as a function of the difference between the sensed road wheel position and the steering wheel position. The steering control unit commands the road wheel actuator to provide controlled steering of the road wheel in response to the road wheel actuator control signal. The steering control unit further commands the steering wheel actuator to provide feedback force actuation to the hand-operated steering wheel in response to the steering wheel control signal. The road wheel actuator control signal and steering wheel actuator control signal are preferably scaled to compensate for difference in gear ratio between the steering wheel and the road wheel. In addition, the road wheel actuator control signal and steering wheel actuator control signal may each have a gain set so that the road wheel control actuator signal commands greater force actuation to the road wheel than the feedback force applied to the steering wheel.

The steer-by-wire system described in U.S. Pat. No. 6,176,341 preferably implements two position control loops, one for the road wheel and one for the hand wheel. The position feedback from the steering wheel becomes a position command input for the road wheel control loop and the position feedback from the road wheel becomes a position command input for the steering wheel control loop. A road wheel error signal is calculated as the difference between the road wheel command input (steering wheel position feedback) and the road wheel position. Actuation of the road wheel is commanded in response to the road wheel error signal to provide controlled steering of the road wheel. A steering wheel error signal is calculated as the difference between the steering wheel position command (road wheel position feedback) and the steering wheel position. The hand-operated steering wheel is actuated in response to the steering wheel error signal to provide force feedback to the hand-operated steering wheel.

The steering control unit of the '341 system could be configured as a single processor or multiple processors and may include a general-purpose microprocessor-based controller, that may include a commercially available off-the-shelf controller. One example of a controller is Model No. 87C196CA microcontroller manufactured and made available from Intel Corporation of Delaware. The steering control unit preferably includes a processor and memory for storing and processing software algorithms, has a clock speed of 16 MHz, two optical encoder interfaces to read position feedbacks from each of the actuator motors, a pulse width modulation output for each motor driver, and a 5-volt regulator.

U.S. Pat. No. 6,370,460 describes a steer-by-wire control system comprising a road wheel unit and a steering wheel unit that operate together to provide steering control for the vehicle operator. A steering control unit may be employed to support performing the desired signal processing. Signals from sensors in the road wheel unit, steering wheel unit, and vehicle speed are used to calculate road wheel actuator control signals to control the direction of the vehicle and steering wheel torque commands to provide tactile feedback to the vehicle operator. An Ackerman correction may be employed to adjust the left and right road wheel angles correcting for errors in the steering geometry to ensure that the wheels will track about a common turn center.

Referring again to FIG. 1, a braking system 83 is mounted to the structural frame 11 and is operably connected to the wheels 73, 75, 77, 79. The braking system 83 in the preferred embodiment is by-wire, as depicted schematically in FIG. 8 wherein like reference numbers refer to like components from FIGS. 6 and 7. Sensors 100 transmit sensor signals 101 carrying information concerning the state or condition of the chassis 10 and its component systems to a braking control unit. The braking control unit 107 is connected to the electrical connector 91 and is configured to receive electrical braking control signals 108 via the electrical connector 91. The braking control unit 107 processes the sensor signals 101 and the electrical braking control signals 108 and generates braking actuator control signals 109 according to a stored algorithm. The braking control unit 107 then transmits the braking actuator control signals 109 to braking actuators 110, 111, 112, 113 which act to reduce the angular velocity of the wheels 73, 75, 77, 79. Those skilled in the art will recognize the manner in which the braking actuators 110, 111, 112, 113 act on the wheels 73, 75, 77, 79. Typically, actuators cause contact between friction elements, such as pads and disc rotors. Optionally, an electric motor may function as a braking actuator in a regenerative braking system. The braking control unit 107 may also generate braking feedback signals 114 for use by a vehicle driver and transmit the braking feedback signals 114 through the electrical connector 91.

A braking transducer 115 may be located on an attached vehicle body 85 and connected to a complementary electrical connector 95 coupled with the electrical connector 91. The braking transducer 115 converts vehicle driver-initiated mechanical braking control signals 116 into electrical form and transmits the electrical braking control signals 106 to the braking control unit via the electrical connector 91.

Figure 8:
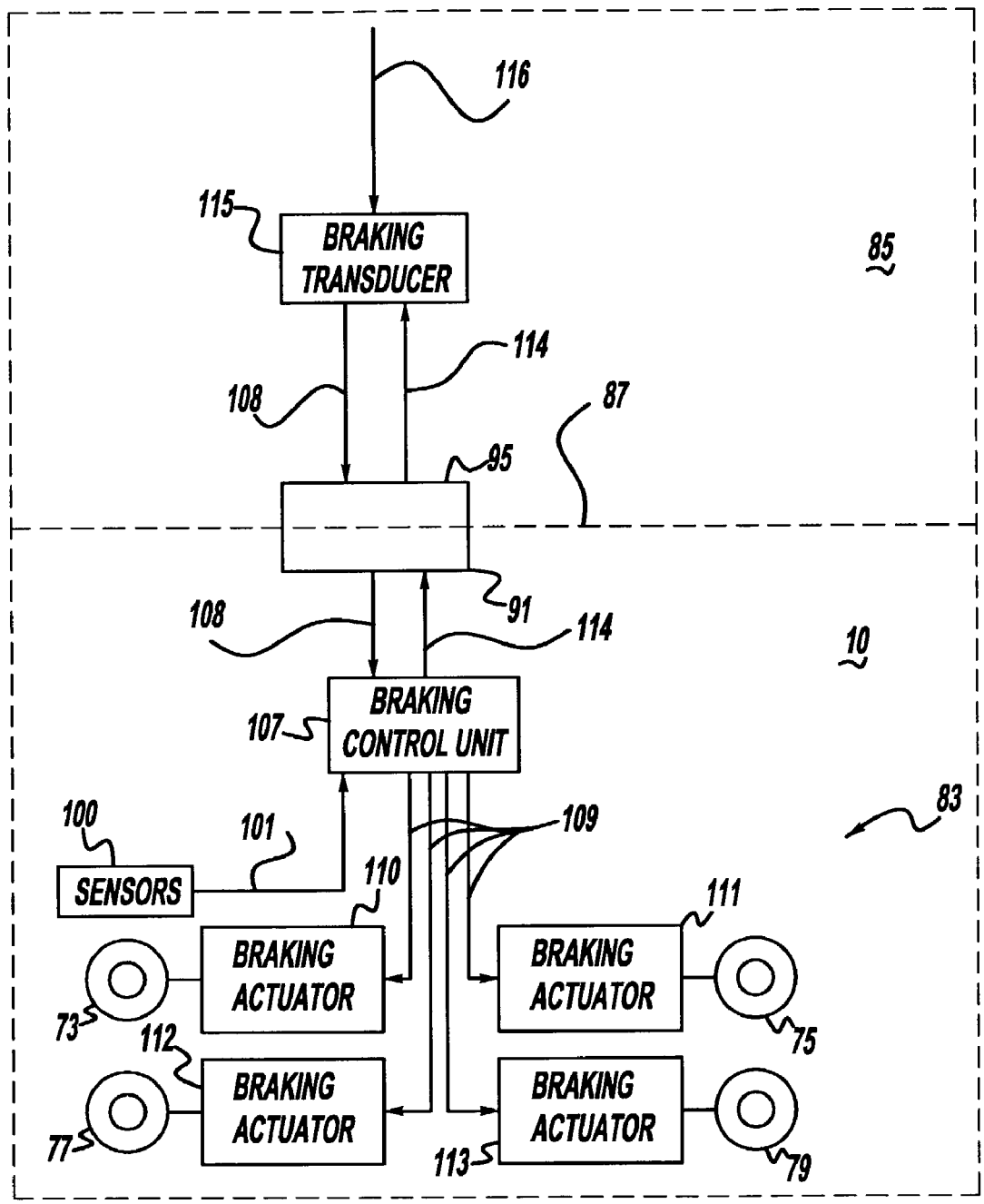
FIG. 8 is a schematic illustration of a braking system for use with the rolling platform and body pod of FIG. 4.
Figure 9:
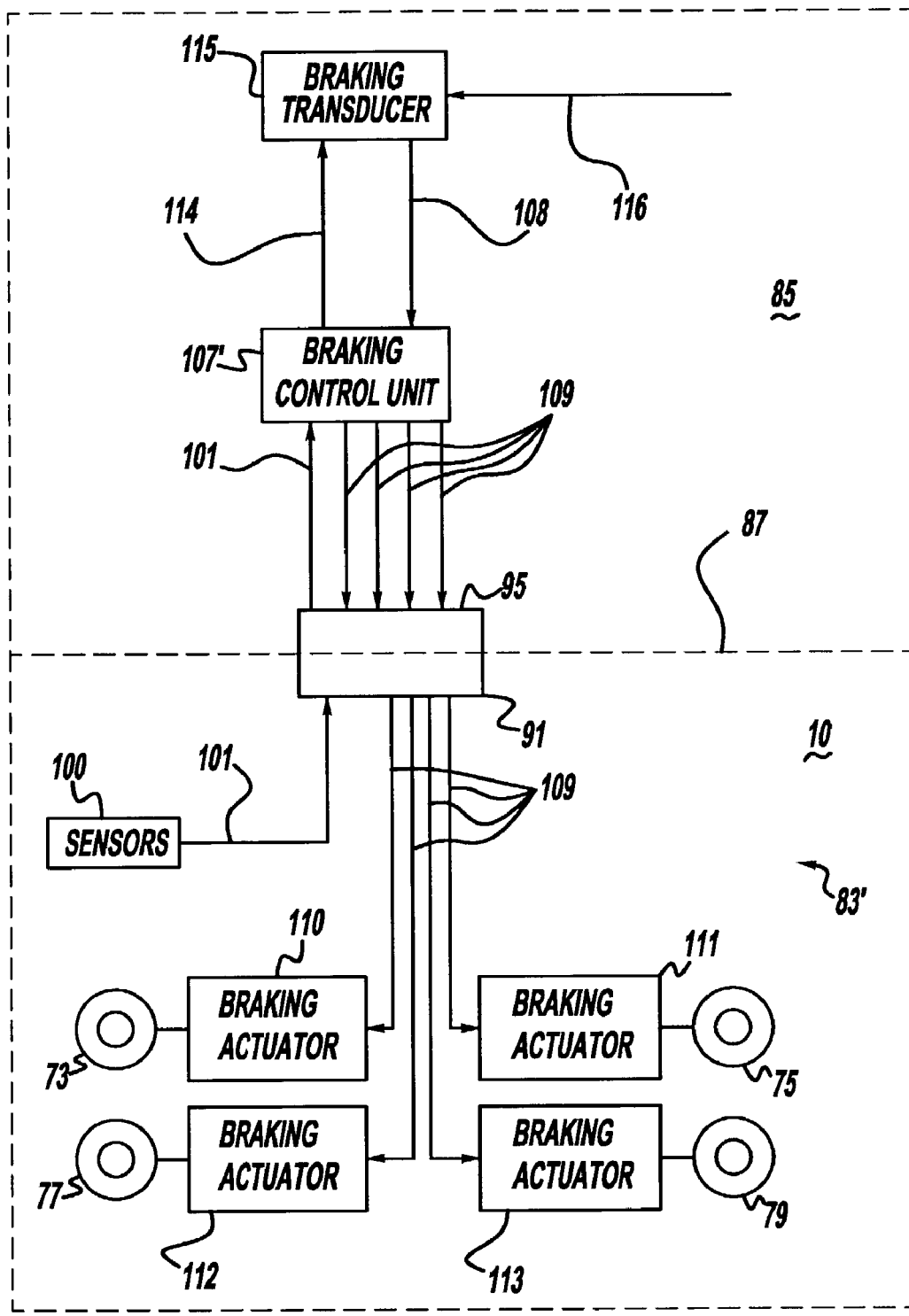
FIG. 9 is a schematic illustration of an alternative braking system for use with the rolling platform and body pod of FIG. 4.

An alternative brake-by-wire system 83' within the scope of the claimed invention is depicted in FIG. 9, wherein like reference numbers refer to like components from FIGS. 6–8. The braking actuators 110, 111, 112, 113 and sensors 100 are connected directly to the electrical connector 91. In this embodiment, a braking control unit 107' may be located in an attached vehicle body 85. A braking transducer 115 transmits electrical braking control signals 108 to the braking control unit 107', and the braking control unit 107' transmits braking actuator signals 109 to the braking actuators 110, 111, 112, 113 via the electrical connector 91.

Examples of brake-by-wire systems are described in U.S. Pat. No. 5,366,281 GM, U.S. Pat. No. 5,823,636 General Motors, and U.S. Pat. No. 6,305,758 Delphi U.S. Pat. No. 6,390,565 Delphi, which are hereby incorporated by reference in their entirety.

The system described in U.S. Pat. No. 5,366,281 includes an input device for receiving mechanical braking control signals, a brake actuator and a control unit coupled to the input device and the brake actuator. The control unit receives brake commands, or electrical braking control signals, from the input device and provides actuator commands, or braking actuator control signals, to control current and voltage to the brake actuator. When a brake command is first received from the input device, the control unit outputs, for a first predetermined time period, a brake torque command to the brake actuator commanding maximum current to the actuator. After the first predetermined time period, the control unit outputs, for a second predetermined time period, a brake torque command to the brake actuator commanding voltage to the actuator responsive to the brake command and a first gain factor. After the second predetermined time period, the control unit outputs the brake torque command to the brake actuator commanding current to the actuator responsive to the brake command and a second gain factor, wherein the first gain factor is greater than the second gain factor and wherein brake initialization is responsive to the brake input.

U.S. Pat. No. 6,390,565 describes a brake-by-wire system that provides the capability of both travel and force sensors in a braking transducer connected to a brake apply input member such as a brake pedal and also provides redundancy in sensors by providing the signal from a sensor responsive to travel or position of the brake apply input member to a first control unit and the signal from a sensor responsive to force applied to a brake apply input member to a second control unit. The first and second control units are connected by a bi-directional communication link whereby each controller may communicate its received one of the sensor signals to the other control unit. In at least one of the control units, linearized versions of the signals are combined for the generation of first and second brake apply command signals for communication to braking actuators. If either control unit does not receive one of the sensor signals from the other, it nevertheless generates its braking actuator control signal on the basis of the sensor signal provided directly to it. In a preferred embodiment of the system, a control unit combines the linearized signals by choosing the largest in magnitude.

Referring again to FIG. 1, the energy storage system 69 stores energy that is used to propel the chassis 10. For most applications, the stored energy will be in chemical form. Examples of energy storage systems 69 include fuel tanks and electric batteries. Referring to FIG. 1, the energy storage system 69 of the preferred embodiment includes two compressed gas cylinder storage tanks 121 mounted within the mid-chassis space 41 and configured to store compressed hydrogen gas. Instead of compressed gas cylinder storage tanks 121, an alternate form of hydrogen storage may be employed such as metal or chemical hydrides. Hydrogen generation or reforming may also be used.

The energy conversion system 67 converts the energy stored by the energy storage system 69 to mechanical energy that propels the chassis 10. In the preferred embodiment, depicted in FIG. 1, the energy conversion system 67 includes a fuel cell stack 125 located in the rear axle area 18, and an electric traction motor 127 located in the front axle area 16. Fuel cell systems for vehicular use are described in U.S. Pat. Nos. 6,195,999, 6,223,843, 6,321,145, and 6,394,207, which are hereby incorporated by reference in their entirety.

Figure 3:
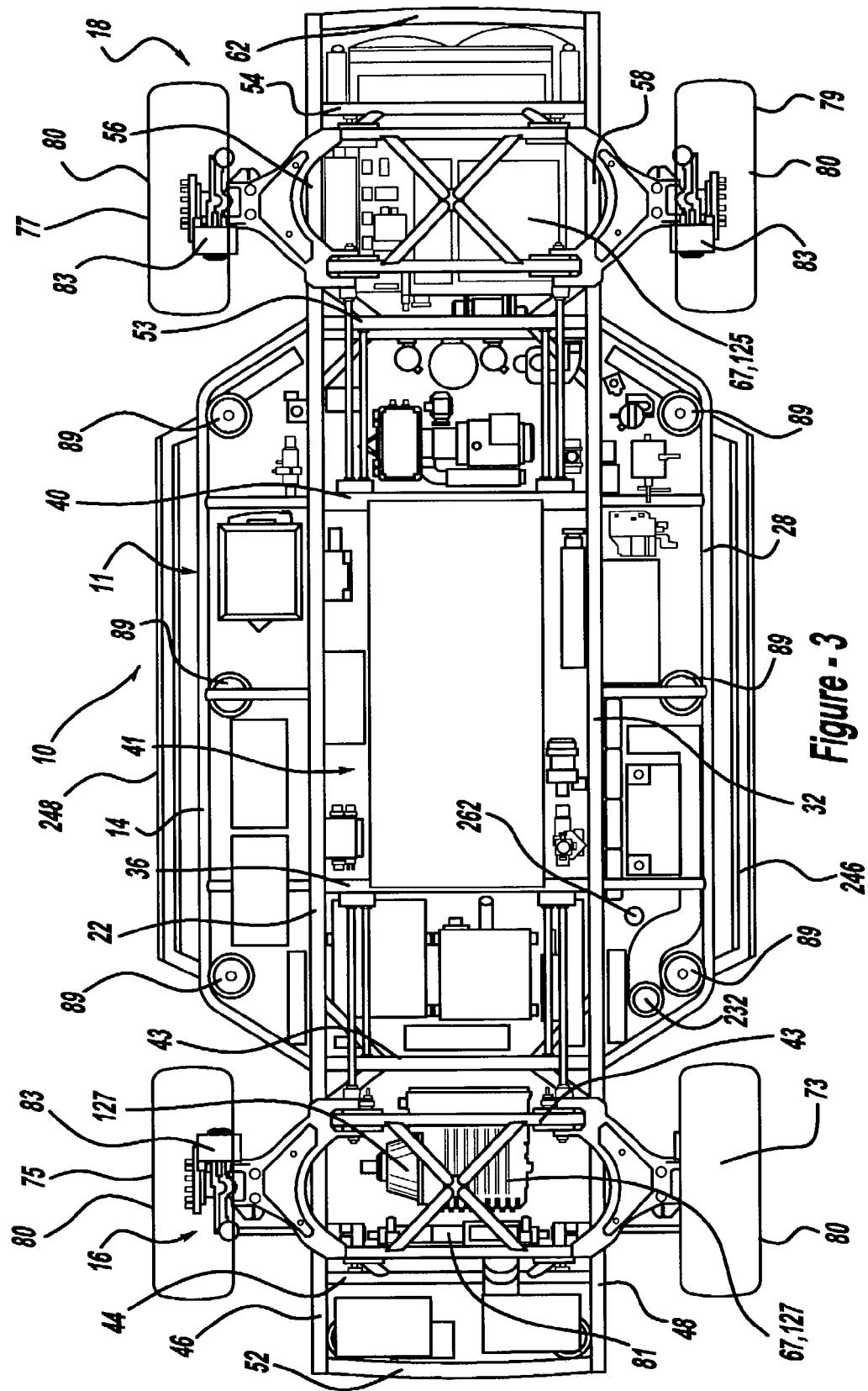
FIG. 3 a bottom view schematic illustration of the vehicle rolling platform shown in FIGS. 1 and 2.

The fuel cell stack 125 is operably connected to the compressed gas cylinder storage tanks 121 and to the traction motor 127. The fuel cell stack 125 converts chemical energy in the form of hydrogen from the compressed gas cylinder storage tanks 121 into electrical energy, and the traction motor 127 converts the electrical energy to mechanical energy, and applies the mechanical energy to rotate the front wheels 73, 75. Optionally, the fuel cell stack 125 and traction motor 127 are switched between the front axle area 16 and rear axle area 18. Optionally, the energy conversion system includes an electric battery (not shown) in hybrid combination with the fuel cell to improve chassis acceleration. Other areas provided between the structural elements are useful for housing other mechanisms and systems for providing the functions typical of an automobile as shown in FIGS. 2 and 3. Those skilled in the art will recognize other energy conversion systems 67 that may be employed within the scope of the present invention.

Figure 10:
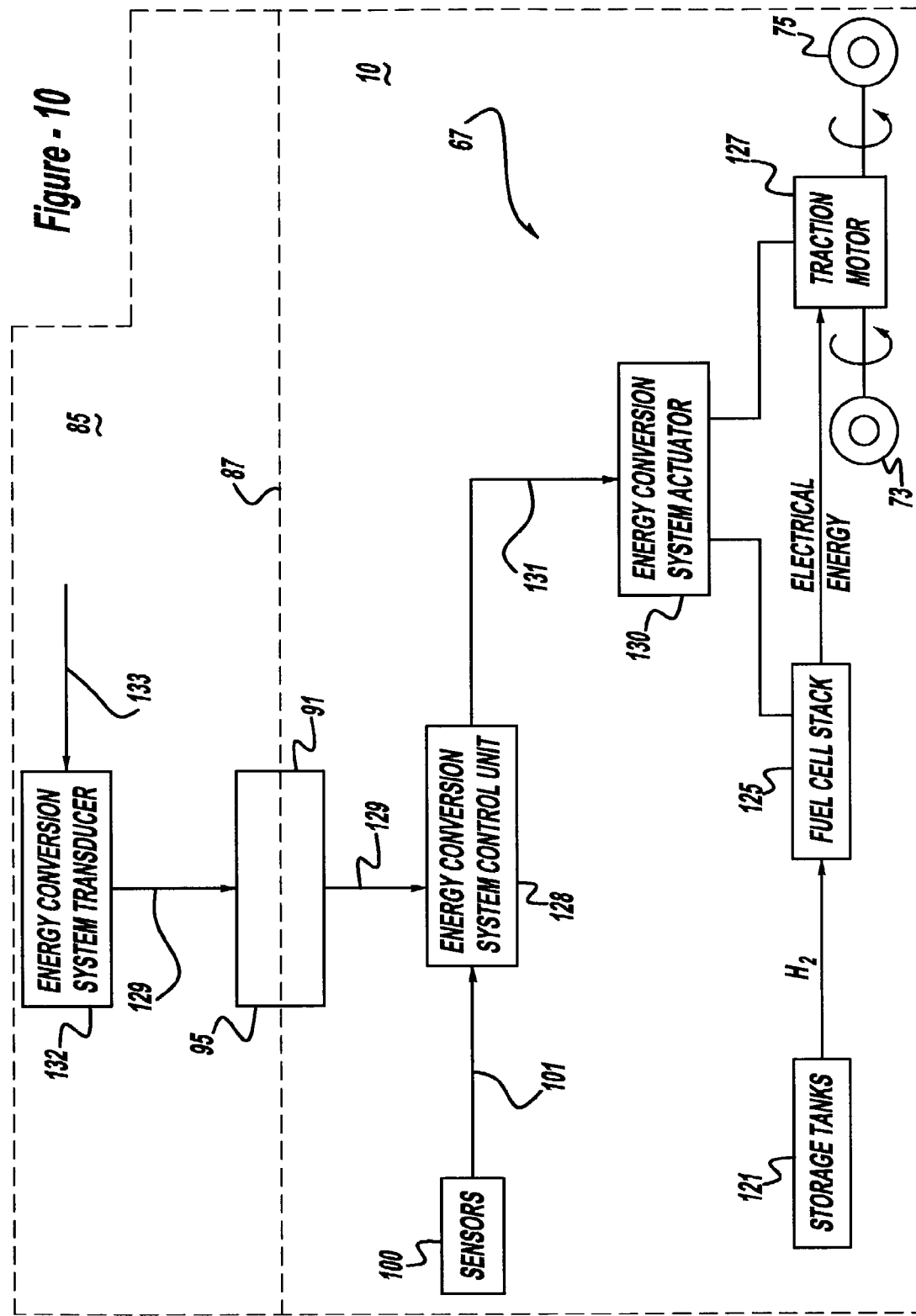
FIG. 10 is a schematic illustration of an energy conversion system for use with the rolling platform and body pod of FIG. 4.

The energy conversion system 67 of the preferred embodiment is controllable by-wire, as depicted in FIG. 10. A programmable energy conversion system control unit 128 is connected to the electrical connector 91 from which it receives electrical energy conversion system control signals 129, and sensors 100 from which it receives sensor signals 101 carrying information about various chassis conditions. The energy conversion system control unit 128 is connected to an energy conversion system actuator 130, and transmits energy conversion system actuator control signals 131 to the energy conversion system actuator 130 in response to the electrical energy conversion system control signals 129 and sensor signals 101 according to a stored algorithm. The energy conversion system actuator 130 acts on the fuel cell stack 125 and traction motor 127 to adjust energy output. Those skilled in the art will recognize the various methods by which the energy conversion system actuator 130 may adjust the energy output of the energy conversion system. For example, a solenoid may alternately open and close a valve that regulates hydrogen flow to the fuel cell stack. Similarly, a compressor that supplies oxygen (from air) to the fuel cell stack may function as an actuator, varying the amount of oxygen supplied to the fuel cell stack in response to signals from the energy conversion system control unit. An energy conversion system transducer 132 may be located on a vehicle body 85 and connected to a complementary electrical connector 95 engaged with the electrical connector 91. The energy conversion system transducer 132 is configured to convert mechanical energy conversion system control signals 133 to electrical energy conversion system control signals 129.

Figure 11:
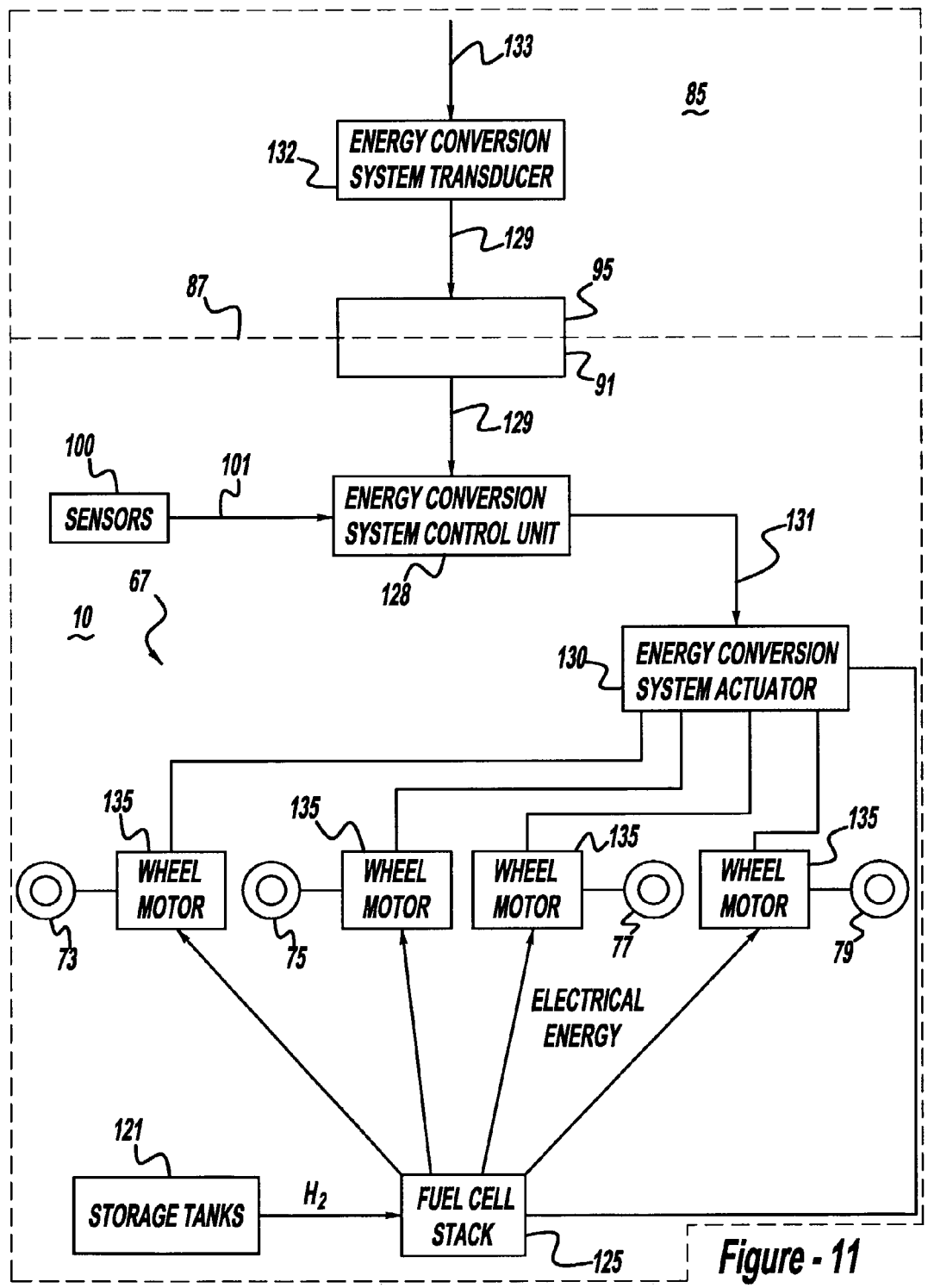
FIG. 11 is a schematic illustration of an alternative energy conversion system for use with the rolling platform and body pod of FIG. 4.

In another embodiment of the invention, as shown schematically in FIG. 11, wherein like reference numbers refer to like components from FIGS. 6–10, wheel motors 135, also known as wheel hub motors, are positioned at each of the four wheels 73, 75, 77, 79. Optionally, wheel motors 135 may be provided at only the front wheels 73, 75 or only the rear wheels 77, 79. The use of wheel motors 135 reduces the height of the chassis 10 compared to the use of traction motors, and therefore may be desirable for certain uses.

Referring again to FIG. 2, a heat exchanger 137 and electric fan system 139, operably connected to the fuel cell stack 125 to circulate coolant for waste heat rejection, is carried in an opening that exists between the rear axle area 18 and the structural elements 54, 60. The heat exchanger 137 is set at an inclined angle to reduce its vertical profile, but to provide adequate heat rejection it also extends slightly above the top of elements 12, 26 (as seen in FIG. 4). Although the fuel cell stack 125, heat exchanger 137 and electric fan system 139 extend above the structural elements, their protrusion into the body pod space is relatively minor when compared to the engine compartment requirements of a conventionally designed automobile, especially when the chassis height of the rolling platform 10 itself is approximately a mere 11 inches (28 centimeters). Optionally, the heat exchanger 137 is packaged completely within the chassis' structure with airflow routed through channels (not shown). In any event, the waste heat rejection system does not protrude significantly beyond the imaginary surface of the interface.

Coolant loop 254 is also in coolant flow communication with fuel cell stack 125 as part of the waste heat rejection system 202. The hot coolant flows through branches 268, 270 to cooling fins 246, 248 on the sides of structural frame 11 of chassis 10. Another coolant loop branch 272 connects with heat exchanger 244 in the HVAC system so that waste heat is used to heat the air received in the vehicle body through duct connector 236.

Figure 22:
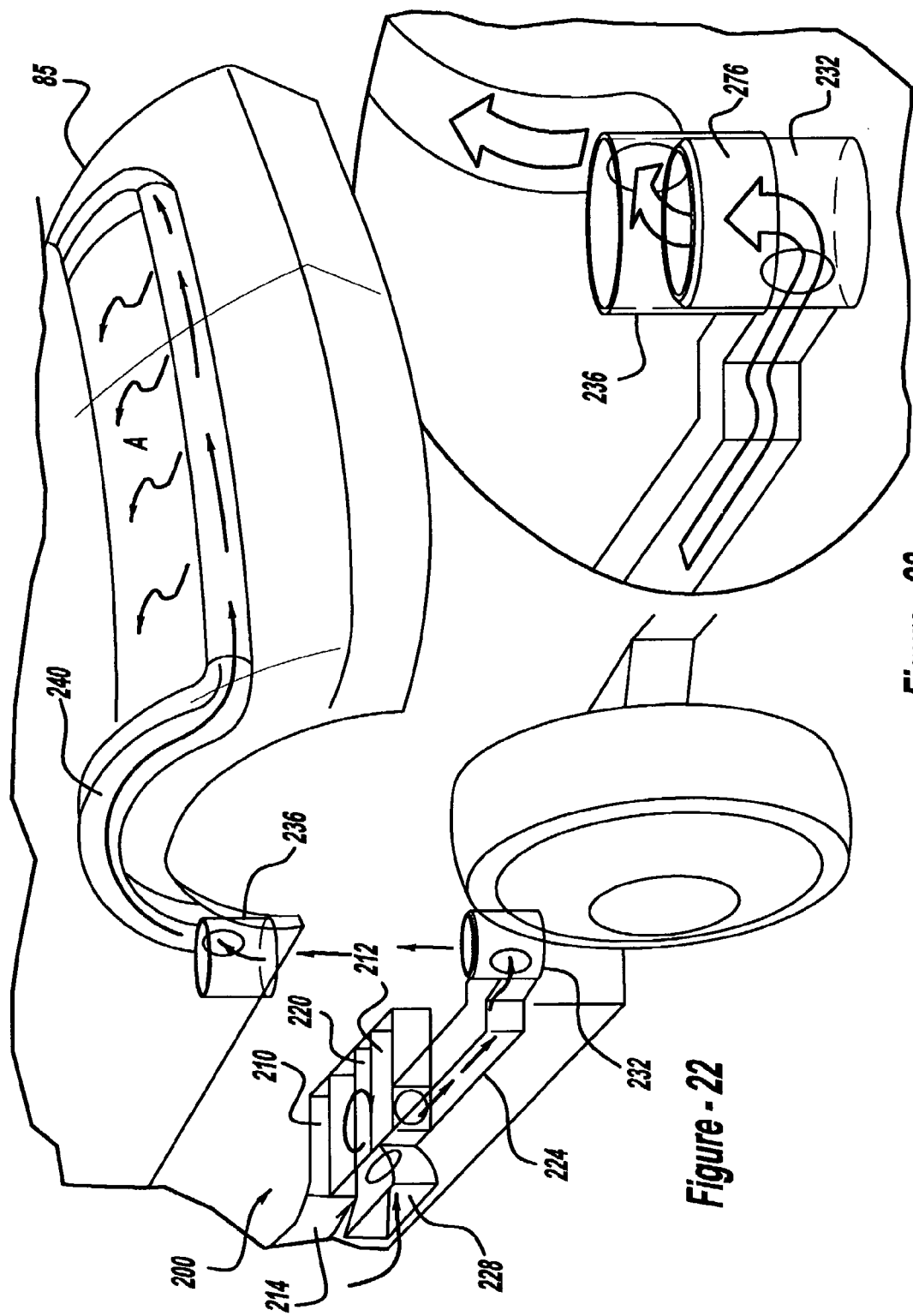
FIG. 22 is a fragmentary exploded perspective view of a mobile chassis and interchangeable body having an easy and unobstructably connectable and disconnectable ducting system for the HVAC system.
Figure 23:
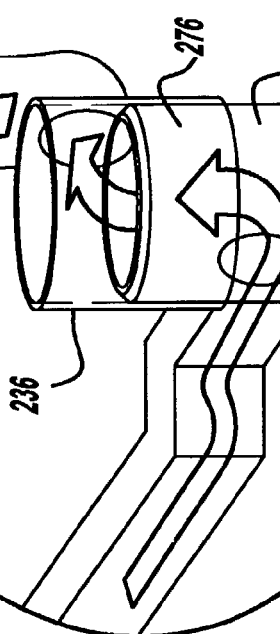
FIG. 23 is an enlarged fragmentary perspective of the disconnectable connector for the ducting system in FIG. 22.

Air flow distribution for the vehicle body 85 is shown in FIGS. 22, 23 and 24. FIG. 22 shows conditioned air entering the vehicle body through inlet connector 236. FIG. 23 shows the detachable couplings 232, 236. A gasket 276 prevents air leakage but does not resist either attachment or detachment of chassis and vehicle body.

FIGS. 23 and 24 show air distribution within the vehicle body and in one embodiment includes air scoops 280, 282 for ram air entry into the distribution duct work 240. Arrows A show air flow into passenger compartment 340 which may be received from HVAC coupling 232. Arrows C show airflow through hollows in the structural frame or roof of the vehicle body, and arrows D show hot exhaust air from the heat exchanger 137.

FIGS. 33 and 34 in another embodiment show air distribution through the chassis 11 for cooling components in the chassis. Air scoops 352 and 354 serve this purpose.

The waste heat rejection system 202 can be modified as shown in FIGS. 27–32. Five heat exchangers 277, 278, 279, 280, 281 are manifolded together in a packaging space 290 in front of the energy conversion system 67. Quick connect conduits or tubing 282 is used to assemble heat exchangers 277–281 in the manner of FIGS. 31*a* and 31*b*, for instance. FIG. 28 is a perspective view of one of the cooling modules with an inlet connection 292 and an outlet connection 294. Such connections are made as quick disconnect fittings so that a plurality of cooling modules can be assembled quickly depending on the waste heat generated by the energy conversion system of the selected vehicle body. FIG. 25 shows a vehicle body hood portion 296 covering the assembled cooling modules, such as 277–281 which in this embodiment are installed in the hood portion by tubing connections. The modules could be curvingly configured for nesting as a packaging technique. Tubing such as 282 could be eliminated if snap-fit or quick disconnect fittings are used on the modules where they nest in a common orientation. FIG. 26 shows the hood portion in a raised position. In this embodiment, flexible coolant conduits or tubes 283 would be used to connect the coolant modules with the fluid flow cooling loop 254 in the chassis. The tubes will need to bend while still serving functionality.

This waste heat rejection system also provides maximum flexibility in utilizing heat exchanger modules. In principle, singular to multiple heat exchanger modules can be utilized in the vehicle bodies 85 and/or the rolling chassis 10. Moreover, and depending on cooling load, the heat exchanger modules use forced air or ram air—forced air at idle and low speed conditions, and ram air at medium to high speeds where air flows naturally through the heat exchanger.

FIG. 29 shows a suitable ram air module 298 having placement connection points 300 in the system 202 and an inlet 302 and an outlet 304. An electric passthrough connection 306 is included for power connectivity.

FIG. 29 also shows a suitable forced air module 310 with a fan shroud 312 having attachment points 314 adapted to match attachment points 316 on the ram air module. Such attachments may be made with bolts or snaps.

FIGS. 30a to 30d show different ways the modules can be connected. FIG. 30a shows a single ram air module 295 with an end cap 320 to connect the module in coolant flow communication with the source or cooling loop 254. FIG. 30b combines two ram air modules 295 with an end cap 320 in coolant flow communication with the source or cooling loop 254. FIG. 30c combines two forced air modules 310 with an end cap 320 in coolant flow communication with the source or coolant loop 254. Power connector 324 to a power source and a cable 326 are used to connect the modules 310 together by snaps, hooks, etc. The distance between the modules varies the connector lengths and shapes. FIG. 30d combines a ram air module 295 with a forced air module 310 and an end cap 320. Electrical connectors 330 connect the forced air module to a power source.

The modules used in the combinations of FIGS. 30a to 30d can have any shape (compound curve, curve, fin, circle) and size. The desire is that each module have the same commonality of connectivity between the modules and their attachment to vehicle body and chassis. Then, if the modules are nested with snap-fit or quick disconnect fittings, the nesting will eliminate space between the modules. This too, increases the efficient packaging of heat exchangers in the rolling platform or vehicle pod.

Thermoelectric modules may also be used in series or parallel with ram/forced air modules. These modules convert heat into electricity. The thermoelectric modules are interchangeable with ram/forced air modules and their power can be utilized by other forced air (fan motor) modules or reprocessed (10–15% return) electricity back to the vehicle body or chassis.

FIGS. 31a and 31b show two combinations using a thermoelectric module 332. FIG. 31a combines in series two thermoelectric modules 332, two forced air modules 310 and a ram air module 298. The electric power generated or created by the thermoelectric units powers the forced air module. Supplemental power in or out or dedicated power in or out is accountable for at connectivity point 334.

FIG. 31b combines two thermoelectric modules with two forced air modules 310, a ram air module 298 and two end caps 326.

FIG. 32 shows the source in 336 to module and source out 338 from module in the chassis or rolling platform 10. Source in at module is source out 336 at chassis and source out at module is source in 338 at chassis. Quick disconnects are used at these connections where vehicle body 85 meets chassis 10 at the attachment interface 87.

Referring again to FIG. 1, the suspension system 71 is mounted to the structural frame 11 and is connected to four wheels 73, 75, 77, 79. Those skilled in the art will understand the operation of a suspension system, and recognize that a multitude of suspension system types may be used within the scope of the claimed invention. The suspension system 71 of the preferred embodiment of the invention is electronically controlled, as depicted schematically in FIG. 12.

Figure 12:
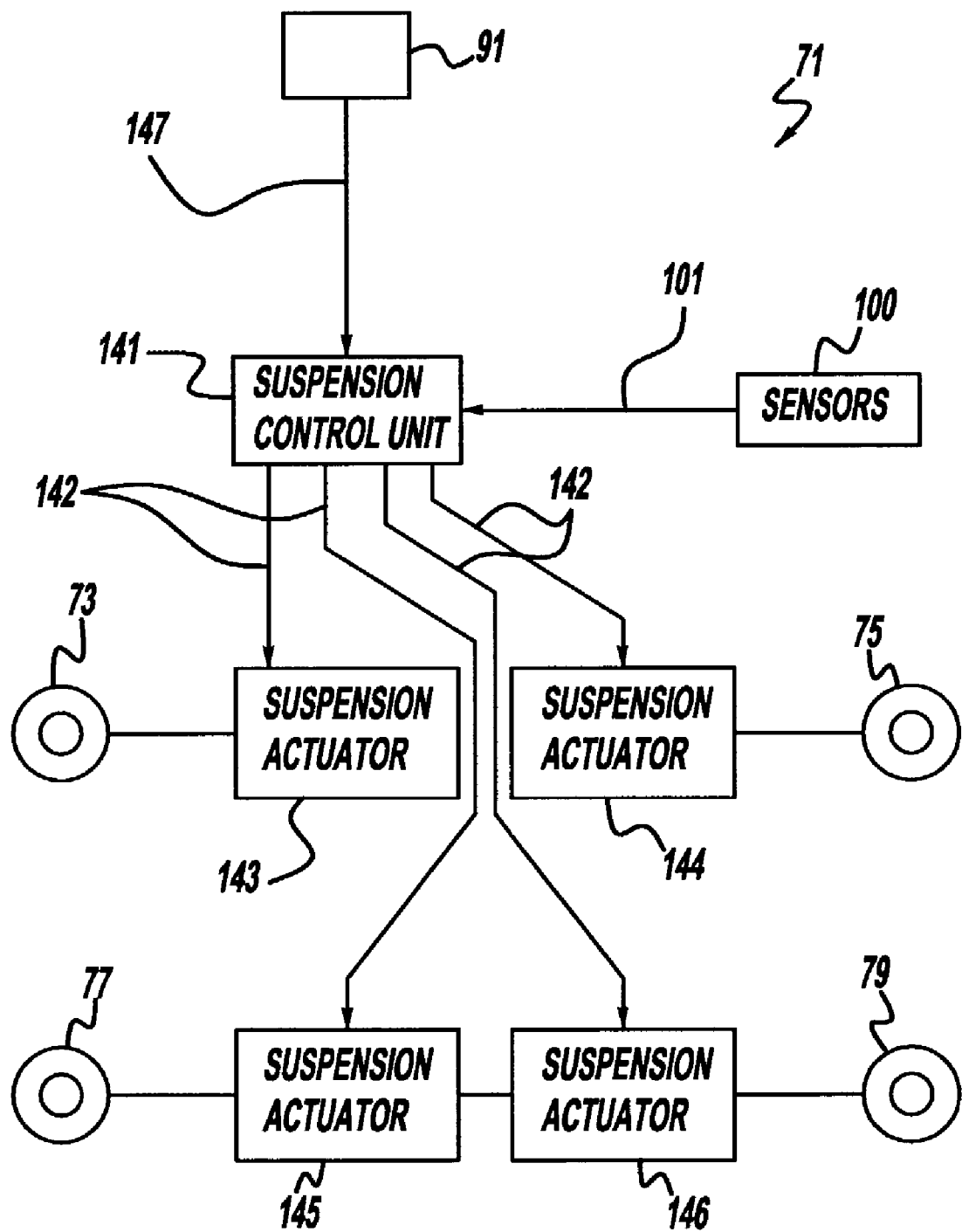
FIG. 12 is a schematic illustration of a suspension system for use with the rolling platform of FIGS. 1–5.

Referring to FIG. 12, the behavior of the electronically controlled suspension system 71 in response to any given road input is determined by a suspension control unit 141. Sensors 100 located on the chassis 10 monitor various conditions such as vehicle speed, angular wheel velocity, and wheel position relative to the chassis 10. The sensors 100 transmit the sensor signals 101 to the suspension control unit 141. The suspension control unit 141 processes the sensor signals 101 and generates suspension actuator control signals 142 according to a stored algorithm. The suspension control unit 141 transmits the suspension actuator control signals 142 to four suspension actuators 143, 144, 145, 146. Each suspension actuator 143, 144, 145, 146 is operably connected to a wheel 73, 75, 77, 79 and determines, in whole or in part, the position of the wheel 73, 75, 77, 79 relative to the chassis 10. The suspension actuators of the preferred embodiment are variable-force, real time, controllable dampers that are known in the art. The suspension system 71 of the preferred embodiment is also configured such that chassis height is controllable by the suspension control unit 141 or by a vehicle driver, in a manner known in the art. Separate actuators may be used to vary the chassis height.

In the preferred embodiment, the suspension control unit 141 is programmable and connected to the electrical connector 91 of the body-attachment interface 87. A vehicle user is thus able to alter suspension system 71 characteristics by reprogramming the suspension control unit 141 with suspension system software 147 via the electrical connector 91.

Figure 13:
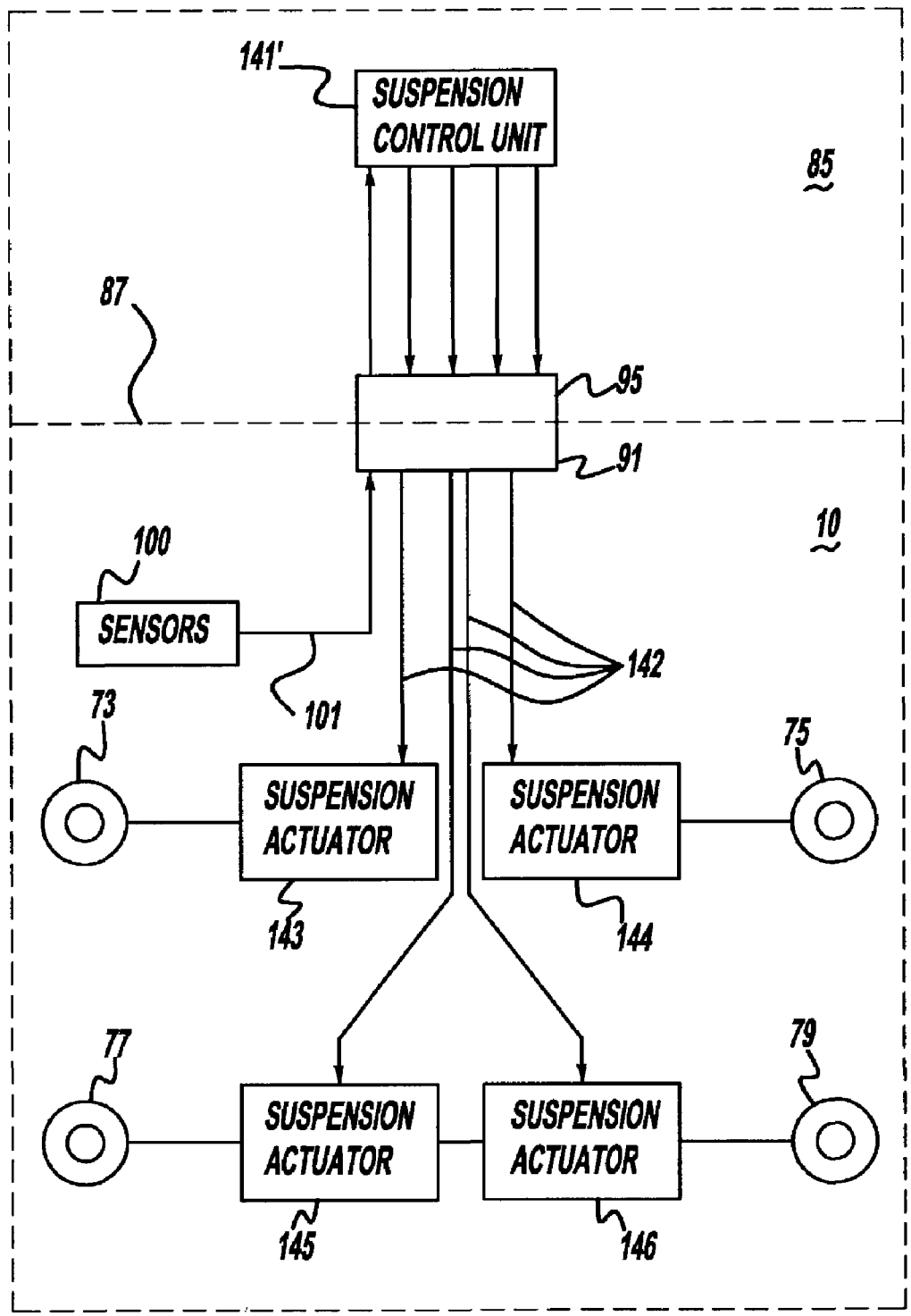
FIG. 13 is a schematic illustration of an alternative suspension system for use with the rolling platform and body pod of FIG. 4.

In the context of the claimed invention, electronically-controlled suspension systems include suspension systems without a suspension control unit. Referring to FIG. 13, wherein like reference numbers are used to reference like components from FIG. 12, suspension actuators 143, 144, 145, 146 and suspension sensors 100 are connected directly to the electrical connector 91 without a suspension control unit 141 on the chassis 10. In such an embodiment, a suspension control unit 141' located on an attached vehicle body 85 can process sensor signals 101 transmitted through the electrical connector 91, and transmit suspension actuator control signals 142 to the suspension actuators 143, 144, 145, 146 via the electrical connector 91.

Examples of electronically controlled suspension systems are described in U.S. Pat. Nos. 5,606,503 and 6,397,134, which are hereby incorporated by reference in their entirety.

U.S. Pat. No. 6,397,134 describes an electronically controlled suspension system that provides improved suspension control through steering crossover events. In particular, the system senses a vehicle lateral acceleration and a vehicle steering angle and stores, for each direction of sensed vehicle lateral acceleration, first and second sets of enhanced suspension actuator control signals for the suspension actuators of the vehicle. Responsive to the sensed vehicle lateral acceleration and sensed vehicle steering angle, the system applies the first set of enhanced actuator control signals to the suspension actuators if the sensed steering angle is in the same direction as the sensed lateral acceleration and alternatively applies the second set of enhanced actuator control signals to the suspension actuators if the sensed steering angle is in the opposite direction as the sensed lateral acceleration.

U.S. Pat. No. 5,606,503 describes a suspension control system for use in a vehicle including a suspended vehicle body, four un-suspended vehicle wheels, four variable force actuators mounted between the vehicle body and wheels, one of the variable force actuators at each corner of the vehicle, and a set of sensors providing sensor signals indicative of motion of the vehicle body, motion of the vehicle wheels, a vehicle speed and an ambient temperature. The suspension control system comprises a microcomputer control unit including: means for receiving the sensor signals; means, responsive to the sensor signals, for determining an actuator demand force for each actuator; means, responsive to the vehicle speed, for determining a first signal indicative of a first command maximum; means, responsive to the ambient temperature, for determining a second signal indicative of a second command maximum; and means for constraining the actuator demand force so that it is no greater than a lesser of the first and second command maximums.

Electrically conductive wires (not shown) are used in the preferred embodiment to transfer signals between the chassis 10 and an attached body 85, and between transducers, control units, and actuators. Those skilled in the art will recognize that other non-mechanical means of sending and receiving signals between a body and a chassis, and between transducers, control units, and actuators may be employed and fall within the scope of the claimed invention. Other non-mechanical means of sending and receiving signals include radio waves and fiber optics.

Figure 14:
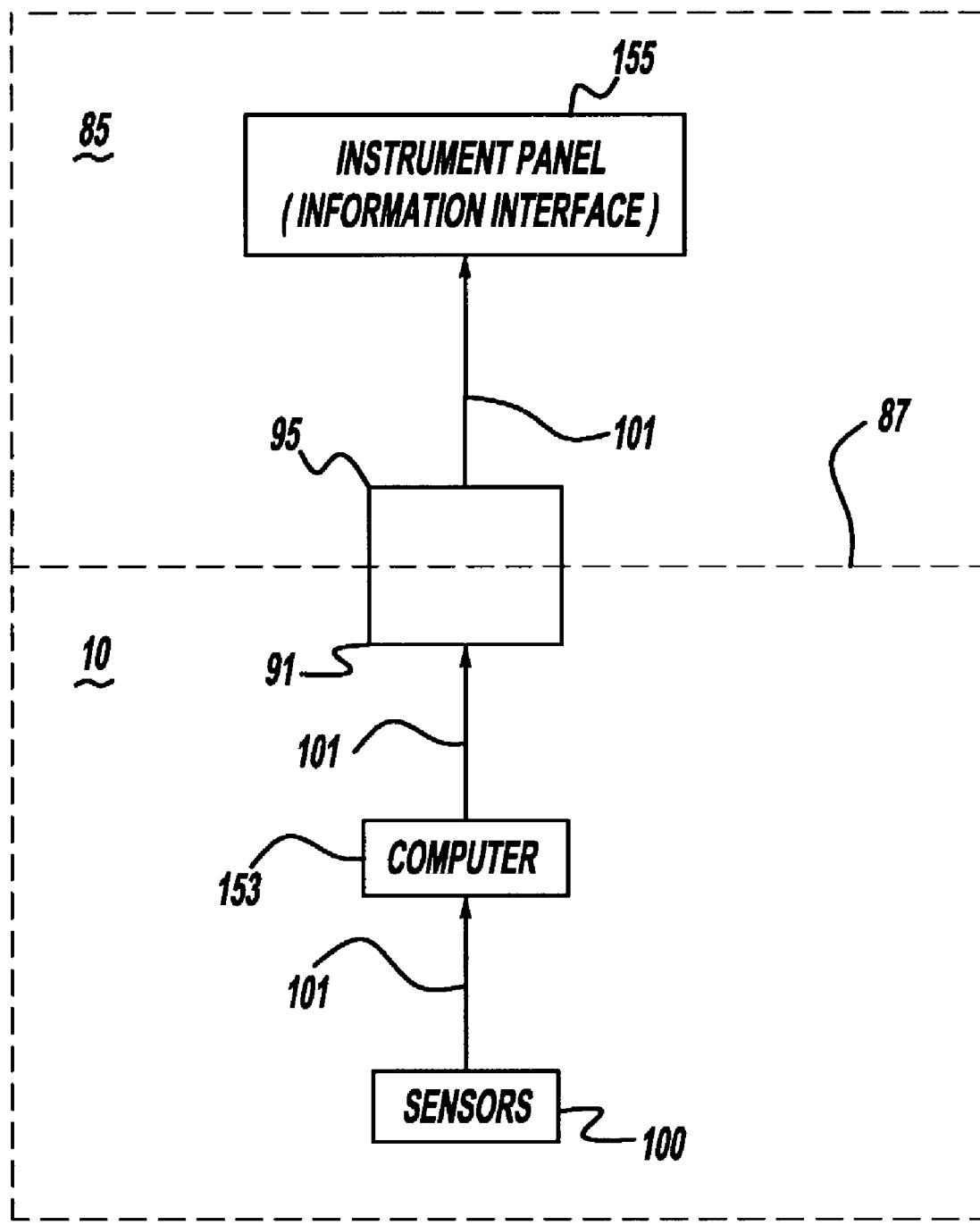
FIG. 14 is a schematic illustration of a chassis computer and chassis sensors for use with the rolling platform and body pod of FIG. 4.

Some of the information collected by the sensors 100, such as chassis velocity, fuel level, and system temperature and pressure, is useful to a vehicle driver for operating the chassis and detecting system malfunctions. As shown in FIG. 14, the sensors 100 are connected to the electrical connector 91 through a chassis computer 153. Sensor signals 101 carrying information are transmitted from the sensors 100 to the chassis computer 153. The chassis computer 153 processes the sensor signals 101 according to a stored algorithm. The chassis computer 153 transmits the sensor signals 101 to the electrical connector 91 when, according to the stored algorithm, the sensor information is useful to the vehicle driver. For example, a sensor signal 101 carrying temperature information is transmitted by the chassis computer 153 when the temperature is unacceptably high. A driver-readable information interface 155 attached to a complementary electrical connector 95 coupled with the electrical connector 91 and displays the information contained in the sensor signals 101. Driver-readable information interfaces include, but are not limited to, gauges, meters, LED displays, and LCD displays.

Figure 15:
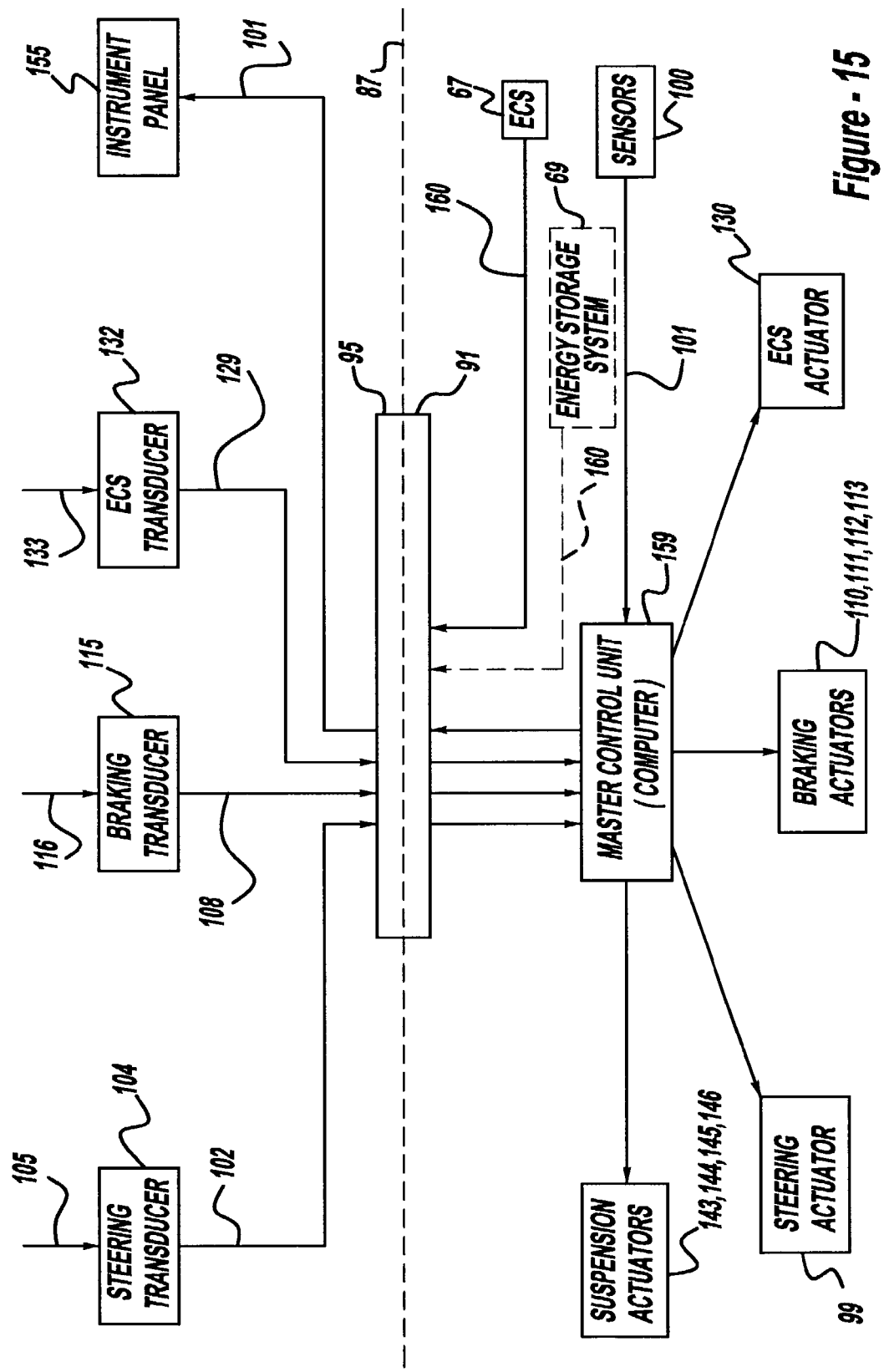
FIG. 15 is a schematic illustration of a master control unit with a suspension system, braking system, steering system, and energy conversion system for use with the rolling platform and body pod of FIG. 4.

One control unit may serve multiple functions. For example, as shown in FIG. 15, a master control unit 159 functions as the steering control unit, braking control unit, suspension control unit, HVAC control system, and energy conversion system control unit. In the preferred embodiment, separate control units are networked, such that sensor status information and electrical control signals are communicated between the individual control units. Networked control units result in a reduction in the quantity of wires connected to the electrical connector 91.

Referring again to FIG. 15, the energy conversion system 67 is configured to transmit electrical energy to the electrical connector 91 to provide electric power for systems located on an attached vehicle body. Optionally, if the energy storage system 69 includes a battery, then the battery may be connected to the electrical connector 91. In the preferred embodiment, the energy conversion system 67 includes a fuel cell stack that generates electrical energy and is connected to the electrical connector 91.

Figure 16:
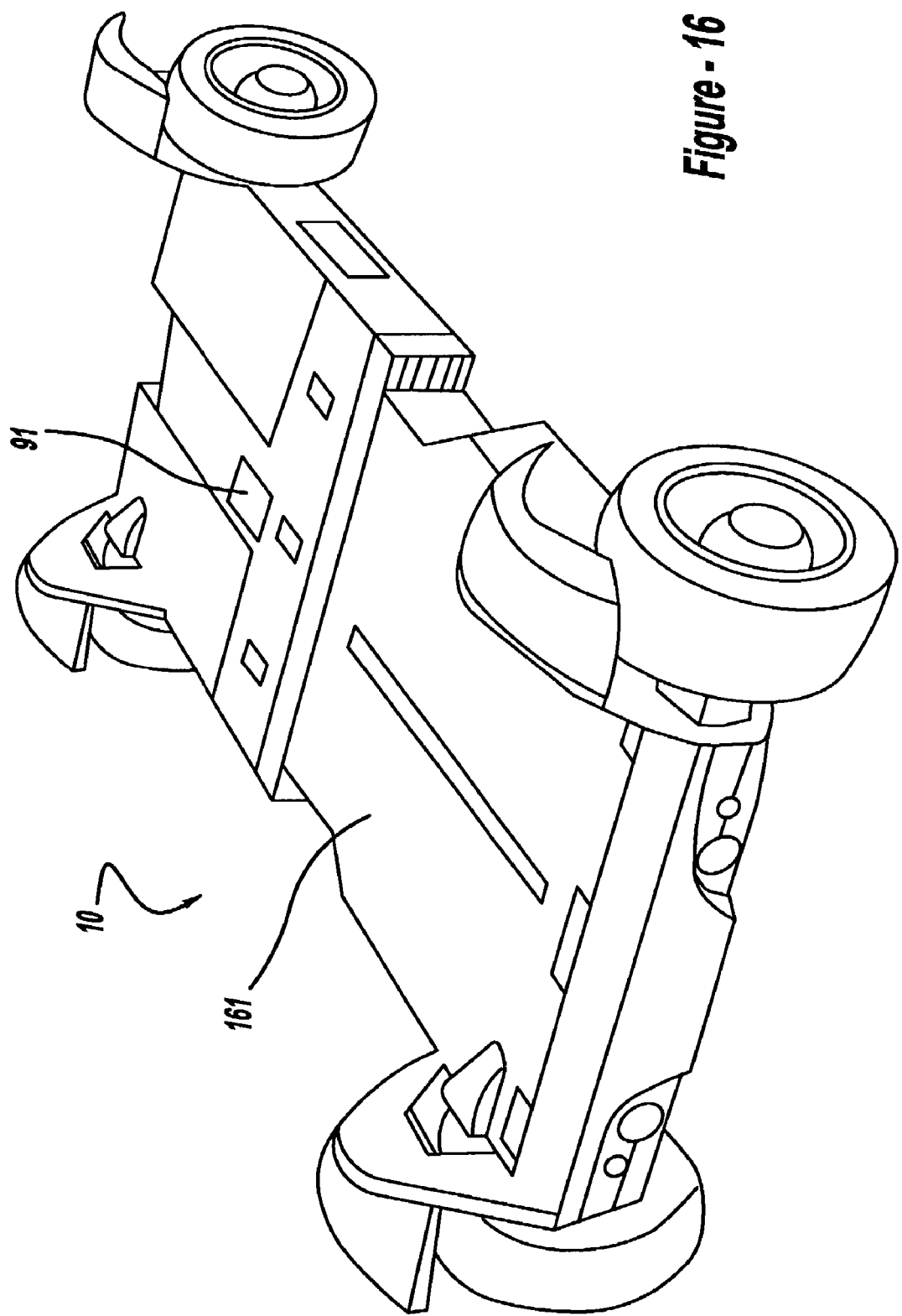
FIG. 16 is a perspective illustration of a skinned rolling platform according to a further embodiment of the present invention.
Figure 17:
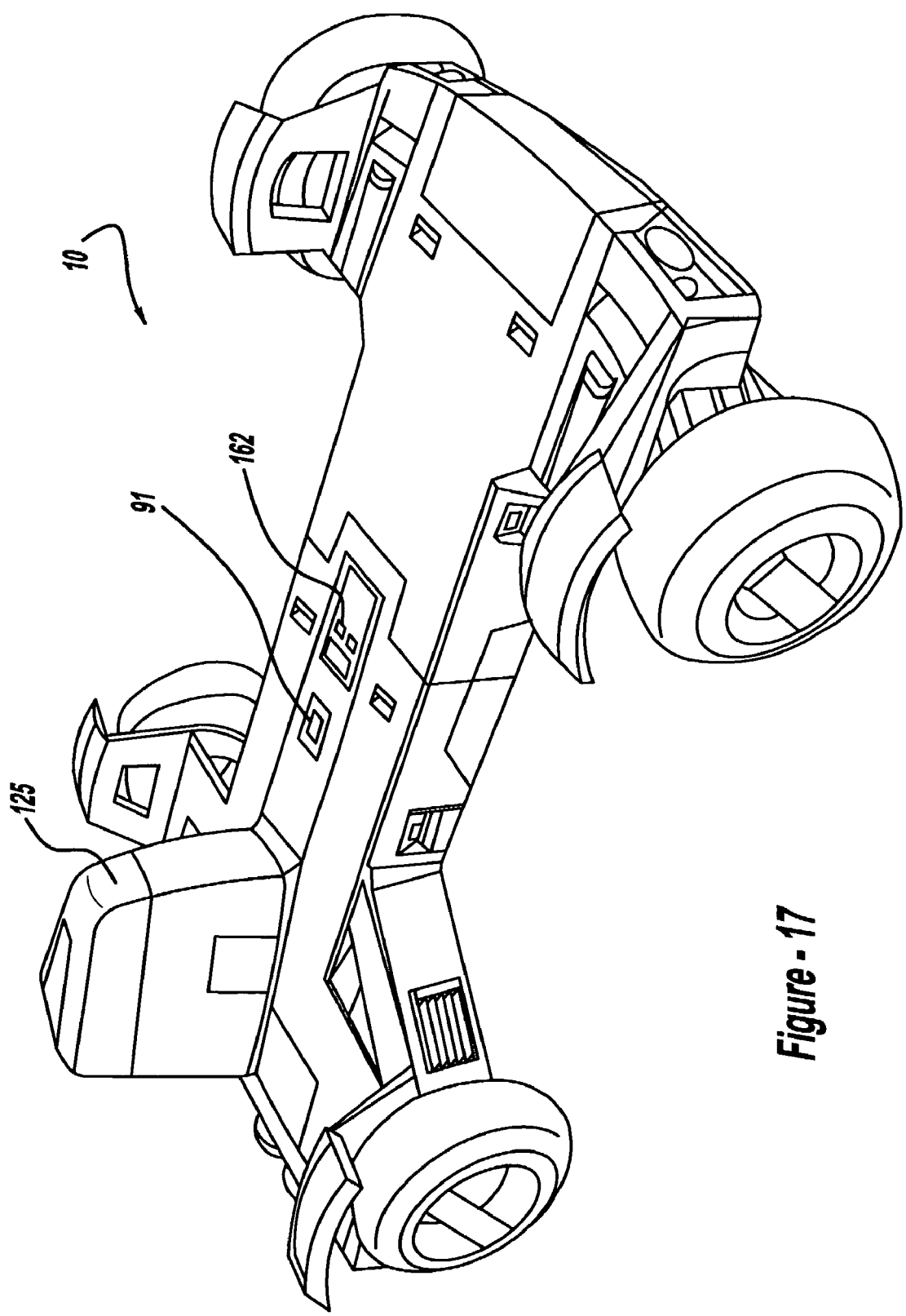
FIG. 17 is a perspective illustration of a skinned rolling platform according to another embodiment of the present invention.

FIG. 16 shows a chassis 10 with rigid covering, or "skin," 161 and an electrical connector or coupling 91 that functions as an umbilical port. The upwardly facing contours of chassis 10 conform to the imaginary surface of the body pods designed to interchangeably mate with this chassis. The rigid covering 161 may be configured to function as a vehicle floor, which is useful if an attached vehicle body 85 does not have a lower surface. In FIG. 17 a similarly equipped chassis 10 is shown with an optional vertical fuel cell stack 125. The vertical fuel cell stack 125 does not protrude significantly into the body pod space beyond the imaginary surface because the body pods which are interchangeable with this chassis all complement this chassis. The chassis 10 also includes a manual parking brake interface 162 that may be necessary for certain applications and therefore is also optionally used with other embodiments.

Figure 18:
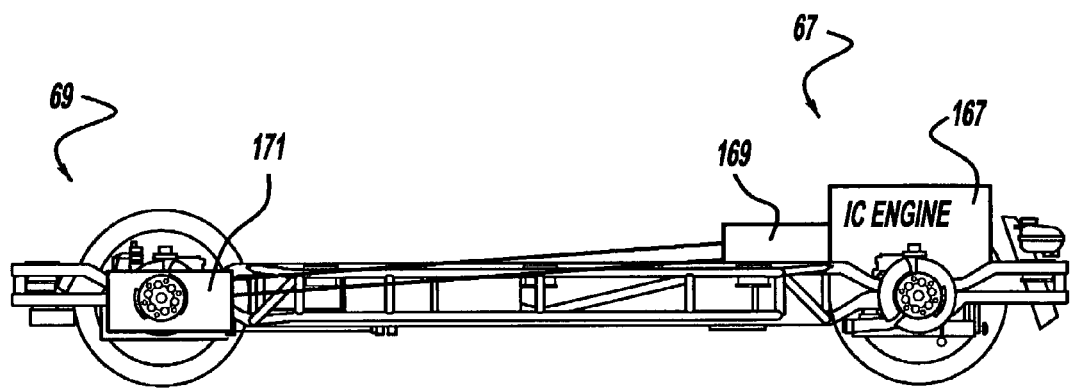
FIG. 18 is a side schematic illustration of a rolling platform with an energy conversion system including an internal combustion engine, and gasoline tanks.

FIG. 18 depicts an embodiment of the invention that may be advantageous in some circumstances. The energy conversion system 67 includes an internal combustion engine 167 with horizontally-opposed cylinders, and a transmission 169. The energy storage system 69 includes a gasoline tank 171.

Figure 19:
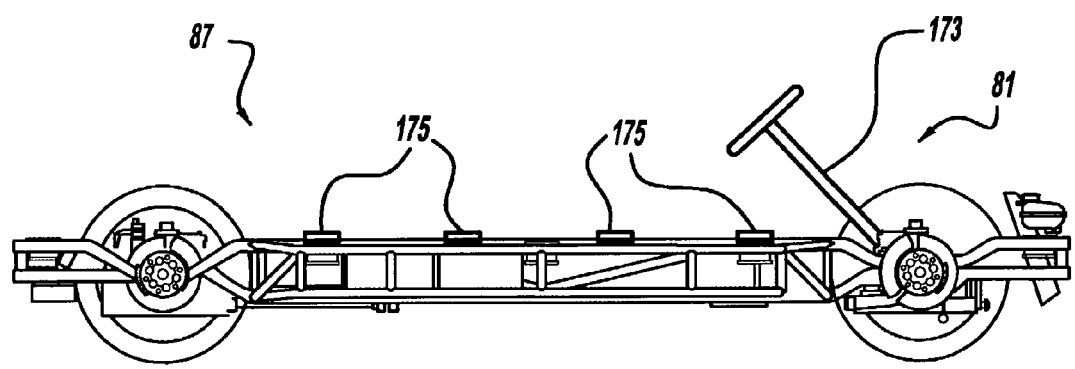
FIG. 19 is a side schematic illustration of a rolling platform according to another embodiment of the invention, with a mechanical steering linkage and passenger seating attachment couplings.

FIG. 19 depicts an embodiment of the invention wherein the steering system 81 has mechanical control linkages including a steering column 173. Passenger seating attachment couplings 175 are present on the body attachment interface 87, allowing the attachment of passenger seating assemblies to the chassis 10.

Figure 20:
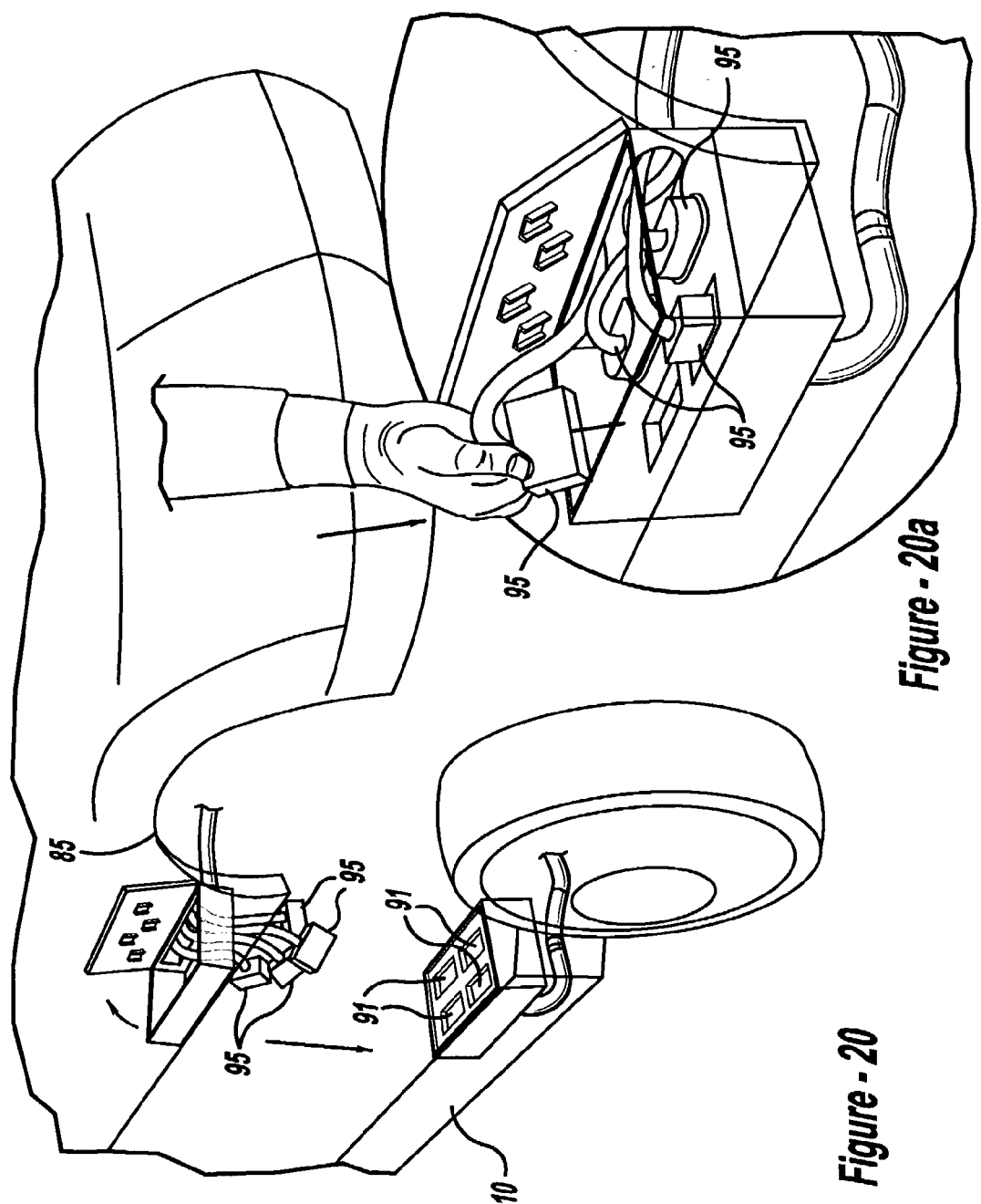

FIGS. 20 and 20a depict a chassis 10 within the scope of the invention and a body 85 each having multiple electrical connectors 91 and multiple complementary electrical connectors 95, respectively. FIG. 20a depicts an assembly process for attaching corresponding connectors 91, 95.

Figure 21:
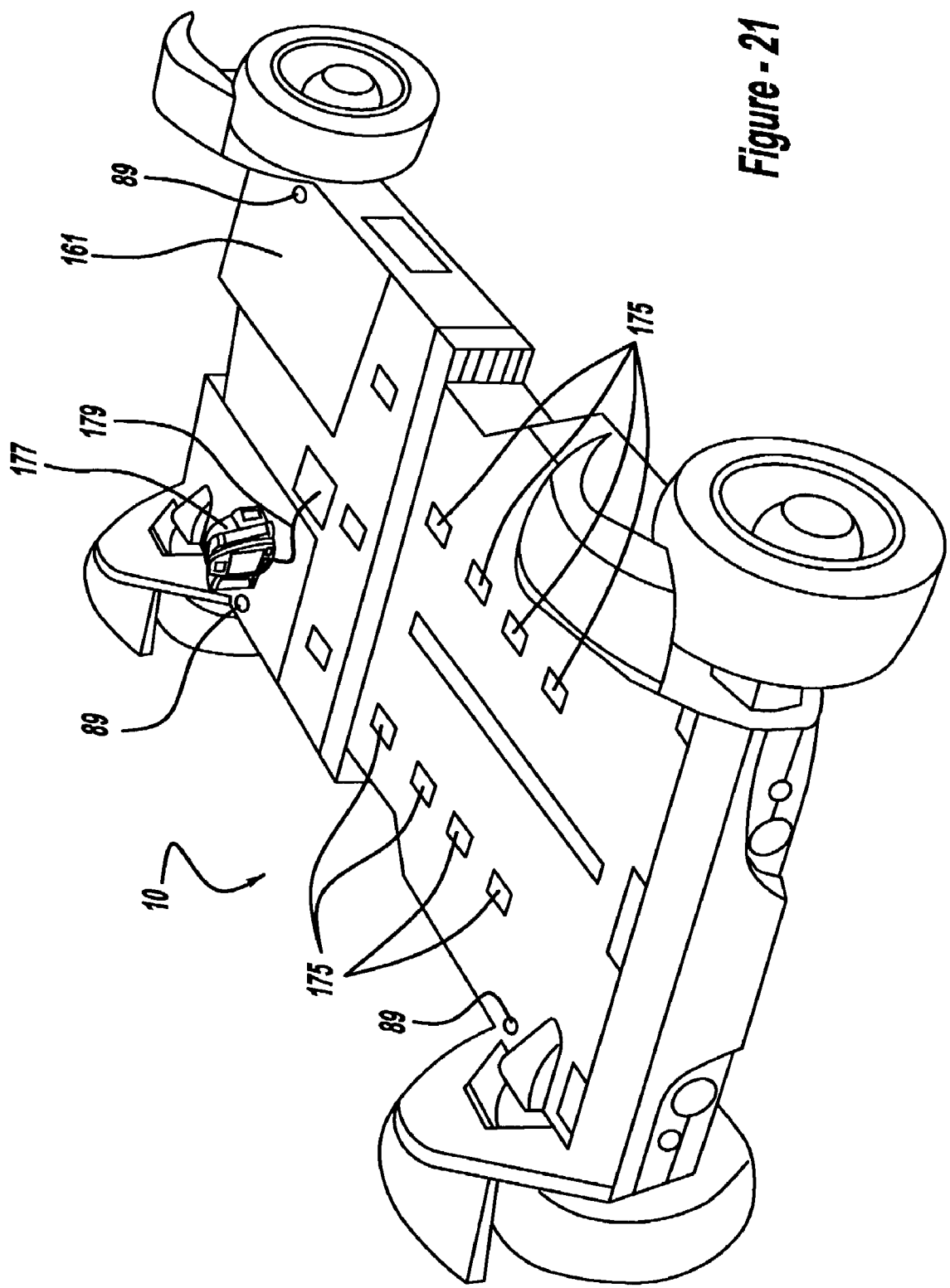
FIG. 21 is a perspective schematic illustration of a skinned rolling platform according to yet another embodiment of the invention, the rolling platform having a movable control input device.

Referring to FIG. 21, a further embodiment of the claimed invention is depicted. The chassis 10 has a rigid covering 161 and a plurality of passenger seating attachment couplings 175. A driver-operable control input device 177 containing a steering transducer, a braking transducer, and an energy conversion system transducer, is operably connected to the steering system, braking system, and energy conversion system by wires 179 and movable to different attachment points.

The embodiment depicted in FIG. 21 enables bodies of varying designs and configurations to mate with a common chassis design. A vehicle body without a lower surface but having complementary attachment couplings is matable to the chassis 10 at the load-bearing body retention couplings 89. Passenger seating assemblies may be attached at passenger seating attachment couplings 175.

While the best modes for carrying out the invention have been described in detail, those familiar with the art to which this invention relates will recognize various alternative designs and embodiments for practicing the scope of the invention within the scope of the appended claims.

The invention claimed is:

1. A mobile chassis for mating with a vehicle body having at least one heating, ventilation and air conditioning (HVAC) duct connector, the chassis comprising:
   a structural frame;
   body attachment components mounted with respect to the frame and adapted to mate with the vehicle body;

an HVAC system mounted with respect to the frame and having an HVAC fluid coupling, the body attachment components and HVAC fluid coupling defining an external interface, the vehicle body being matable with the chassis at the external interface; and the HVAC fluid coupling being operably connectable to the HVAC duct connector at the external interface when the vehicle body is mated with the chassis.

2. The mobile chassis of claim 1, in combination with the vehicle body and including an air flow control in the HVAC system, the air flow control having a control signal receiver connector, and the vehicle body having a transmitter for sending by wire to the receiver connector a signal for selectively operating the air flow control.

3. The mobile chassis of claim 1, in combination with a vehicle body having hollow structural members forming a second air flow duct in air flow communication with the air flow coupling and air flow duct of the air cooling system.

4. A mobile chassis for mating with a vehicle body having at least one heating, ventilation and air conditioning (HVAC) duct connector, the chassis comprising:

a frame having a plurality of interconnected spaced-apart structural members;

body attachment components connected to the frame and adapted to mate with the vehicle body;

an HVAC system mounted with respect to the frame and having an HVAC fluid coupling, the body attachment components and HVAC fluid coupling defining an external interface, the vehicle body being matable with the chassis at the external interface; and the HVAC fluid coupling being operably connectable to the HVAC duct connector at the external interface when the vehicle body is mated with the chassis.

5. The mobile chassis of claim 4, including a waste heat emitting cooling loop connected to the HVAC system so that the waste heat emitted by the cooling loop is in fluid flow communication with the HVAC fluid coupling.

6. The mobile chassis of claim 5, including a supplemental heating element in fluid flow communication with the HVAC fluid coupling.

7. The mobile chassis of claim 4, including a plurality of HVAC fluid couplings connectable respectively with a plurality of HVAC duct connectors on the vehicle body.

8. The mobile chassis of claim 4, in combination with the vehicle body wherein the vehicle body includes fluid flow directing structure for directing the fluid flow as desired in the vehicle body.

9. A mobile chassis for vehicle body interchangeability comprising;

a structural frame having a plurality of spaced-apart structural members interconnected in a manner to define a plurality of packaging spaces and an external interface;

a propulsion system at least partially in at least one of the packaging spaces and controllable by wire and including a disconnectable connector in the interface operable to disconnect the controllability of the mobile chassis by wire; and a heating, ventilation and air conditioning (HVAC) system in at least another of the packaging spaces and having an unobstructed, disconnectable HVAC fluid coupling in the external interface connectable to a vehicle body to direct the heating, ventilation and air conditioning from the HVAC system, the external interface being an imaginary surface that includes the unobstructed, disconnectable HVAC fluid coupling when the structural frame with the propulsion and HVAC systems therein moves toward a vehicle body being interchanged.

10. A mobile chassis for use with an interchangeable vehicle body characterized by novel waste heat rejection and heating, ventilation and air conditioning (HVAC), comprising:

a frame defining a plurality of open spaces and an upper chassis face having connective elements adapted to connect at an imaginary interface with complementary connective elements on a vehicle body being interchanged;

a suspension system including at least three wheels;

a steering system having steering components, mounted with respect to the frame and operably connected to at least one wheel;

an energy conversion system having energy conversion system components, mounted with respect to the frame and operably connected to at least one wheel;

a waste heat rejection system having waste heat rejection system components being operably connected to the energy conversion system, the waste heat rejection components including a cooling loop and a heat exchanger in heat exchange relationship with the energy conversion system, the cooling loop being operably connected to the heat exchanger;

an HVAC system having HVAC system components and operably connected to the cooling loop;

a braking system having braking components, mounted with respect to the frame and operably connected to at least one wheel;

a plurality of body-connection components mounted with respect to the frame, including a plurality of body-retention couplings, a control signal receiver connector, and an HVAC fluid coupling in the HVAC system;

wherein the control signal receiver connector is characterized as control-by wire and is operably connected to the HVAC system, braking system, steering system, and energy conversion system;

wherein the steering components, energy conversion system components, waste heat rejection system components, braking components, HVAC system components, and body connection components are mounted within the open spaces and do not protrude significantly outside the frame or beyond the imaginary interface.

11. An operable automotive vehicle combination comprising:

multiple connectable and interchangeable vehicle bodies, a connectable and separable vehicle chassis;

each of the multiple bodies having at least one heating ventilation and air conditioning (HVAC) duct connector part in a fixed position common to each of the vehicle bodies;

at least one electrical connector having a connectable and easily separable first electrical connector part connected to the chassis and a connectable and easily separable second electrical connector part complementary to said first electrical connector part and connected to each of the bodies; and at least one structural connector having a connectable and easily separable first structural connector part connected to the chassis and a connectable and easily separable structural connector part complementary to said first structural part and connected to each of the bodies;

wherein the first and second electrical connector parts substantially define an electrical interface portion between a body and the chassis when the first and second electrical connector parts are connected;

wherein the first and second structural connector parts substantially define a structural interface portion between a body and the chassis when the first and second structural connector parts are connected;

wherein each body and the chassis define a substantially planar connection interface substantially including the structural and electrical interface portions when a vehicle body and the vehicle chassis are connected;

wherein the connection of the structural and electrical parts at the substantially planar connection interface when one of the multiple vehicle bodies and the vehicle chassis are connected permits the automotive vehicle to operate and wherein easy separation of the structural and electrical parts from the connection interface permits another of the multiple vehicle bodies to be interchanged with the vehicle chassis for said one of the multiple vehicle bodies; and wherein the chassis further comprises a frame having a plurality of spaced-apart structural members interconnected in a manner to define a plurality of internal packaging spaces and an external interface substantially coextensive with said planar connection interface and to connect with each of the multiple vehicle bodies; and an HVAC system at least partially in at least one of the packaging spaces and having an HVAC fluid coupling mounted in the planar connection interface in a sufficiently fixed, unobstructed position with respect to the frame so that the HVAC fluid coupling unobstructably operably connects to the HVAC duct connector of each one of the multiple vehicle bodies when a selected one of the multiple bodies is connected with the chassis.

12. A body and chassis automotive vehicle combination comprising:

a connectable vehicle body;

a chassis including a frame, an HVAC system, and at least one system selected from the group consisting of a by-wire braking system, a by-wire suspension system, a by-wire energy conversion system and a by-wire steering system, and on which the body is supportable and which defines with the body a connection interface;

said connection interface including matable connector parts respective to each of the vehicle body and the chassis which operably connect respectively with each other at the connection interface when the vehicle body is connected with the chassis; and wherein the matable connector parts include a fluid coupling respectively on each of the body and the chassis for fluidly connecting the HVAC system with the body for air flow communication between the body and the chassis.

* * * * *